(12) United States Patent
Park et al.

(10) Patent No.: US 10,567,648 B2
(45) Date of Patent: Feb. 18, 2020

(54) DISPLAY DEVICE AND METHOD OF CONTROLLING THEREFOR

(71) Applicant: LG ELECTRONICS INC., Seoul (KR)

(72) Inventors: Sihwa Park, Seoul (KR); Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 14/527,341

(22) Filed: Oct. 29, 2014

(65) Prior Publication Data
US 2016/0062563 A1 Mar. 3, 2016

(30) Foreign Application Priority Data

Aug. 27, 2014 (KR) .......................... 10-2014-0112185

(51) Int. Cl.
*G06F 3/0482* (2013.01)
*G06F 3/0484* (2013.01)
*H04N 5/232* (2006.01)

(52) U.S. Cl.
CPC ............................... *H04N 5/23238* (2013.01)

(58) Field of Classification Search
CPC ... H04N 5/23238; H04N 5/76; H04N 21/2387
See application file for complete search history.

(56) References Cited

U.S. PATENT DOCUMENTS

| | | | |
|---|---|---|---|
| 2001/0005208 A1* | 6/2001 | Minami | G06T 11/00 345/474 |
| 2002/0140829 A1* | 10/2002 | Colavin | G06T 3/403 348/231.99 |
| 2006/0120624 A1* | 6/2006 | Jojic | G06F 17/30843 382/284 |
| 2006/0195876 A1* | 8/2006 | Calisa | G08B 13/19656 725/105 |
| 2007/0237423 A1 | 10/2007 | Tico et al. | |
| 2009/0153586 A1* | 6/2009 | Yang | G06T 3/4038 345/629 |
| 2010/0220197 A1 | 9/2010 | Dukellis et al. | |
| 2011/0141300 A1* | 6/2011 | Stec | G06T 3/4038 348/222.1 |

(Continued)

FOREIGN PATENT DOCUMENTS

KR  10-2008-0007849 A  1/2008
KR  10-2013-0059658 A  6/2013

*Primary Examiner* — Arpan P. Savla
*Assistant Examiner* — Parmanand D Patel
(74) *Attorney, Agent, or Firm* — Birch, Stewart, Kolasch & Birch, LLP

(57) ABSTRACT

The present specification relates to a display device and a method of controlling therefor. According to one embodiment of the present specification, a method of controlling a display device may include the steps of displaying a video image and a timeline interface corresponding to the video image, setting frames of which correlation is greater than a predetermined ratio among a plurality of frames included in the video image as a first frame group, setting a first point and a second point on the timeline interface based on the first frame group, setting a first panorama section between the set first point and the second point and displaying a first panorama interface corresponding to the first panorama section.

16 Claims, 20 Drawing Sheets

(56) References Cited

U.S. PATENT DOCUMENTS

| | | | |
|---|---|---|---|
| 2012/0206566 A1* | 8/2012 | Fedoseyeva | G06Q 10/06398 348/38 |
| 2012/0242783 A1 | 9/2012 | Seo et al. | |
| 2012/0293607 A1* | 11/2012 | Bhogal | G06T 3/4038 348/36 |
| 2012/0300019 A1* | 11/2012 | Yang | H04N 5/23232 348/36 |
| 2013/0038680 A1 | 2/2013 | Mashiah | |
| 2013/0135428 A1 | 5/2013 | Choi | |
| 2013/0159860 A1* | 6/2013 | Bhatt | G11B 27/10 715/720 |
| 2013/0195419 A1* | 8/2013 | Hayashi | H04N 5/232 386/225 |
| 2013/0222640 A1 | 8/2013 | Baek et al. | |
| 2013/0243351 A1* | 9/2013 | Feng | G06T 3/4038 382/284 |
| 2014/0072281 A1 | 3/2014 | Cho | |
| 2015/0035857 A1* | 2/2015 | Lowe | G09G 5/377 345/629 |

\* cited by examiner

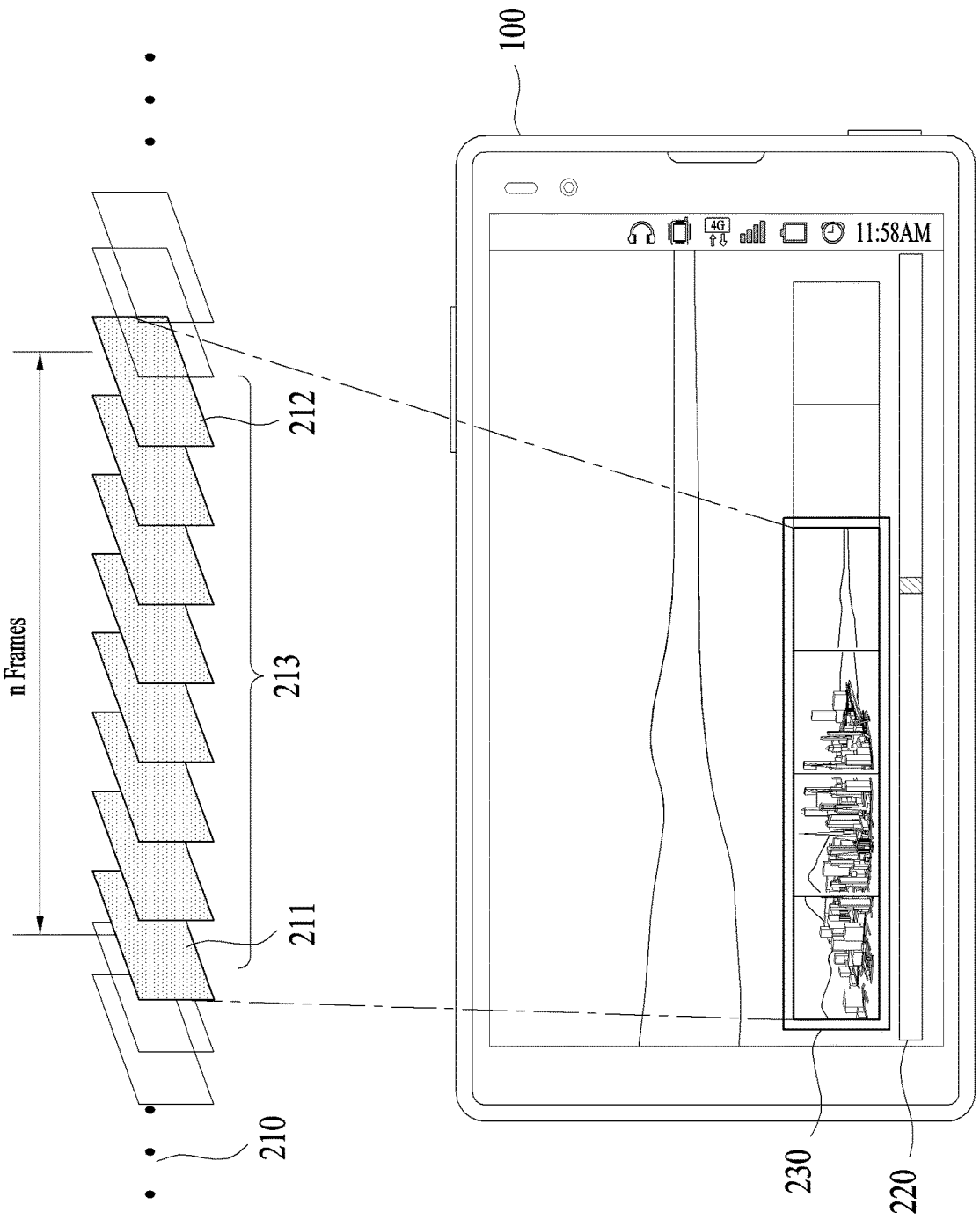

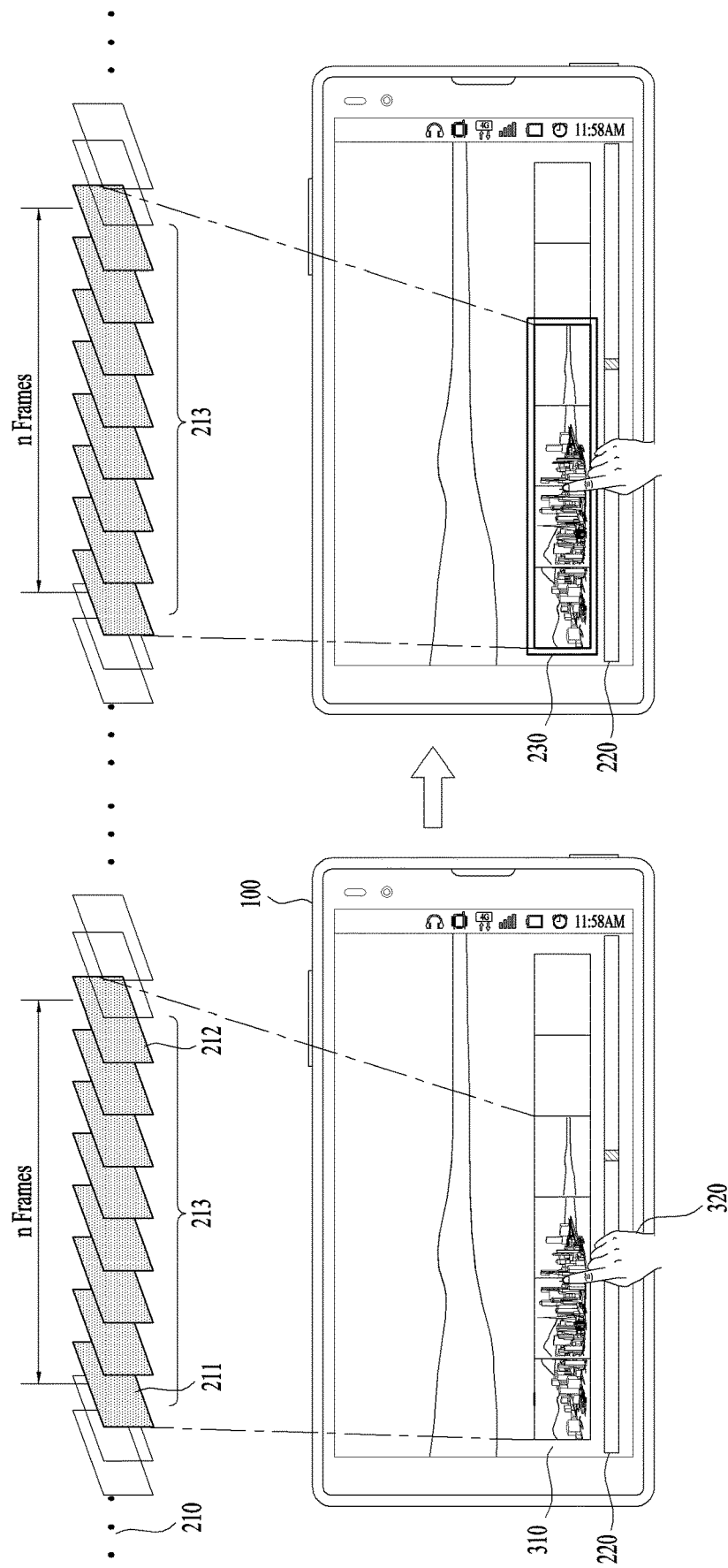

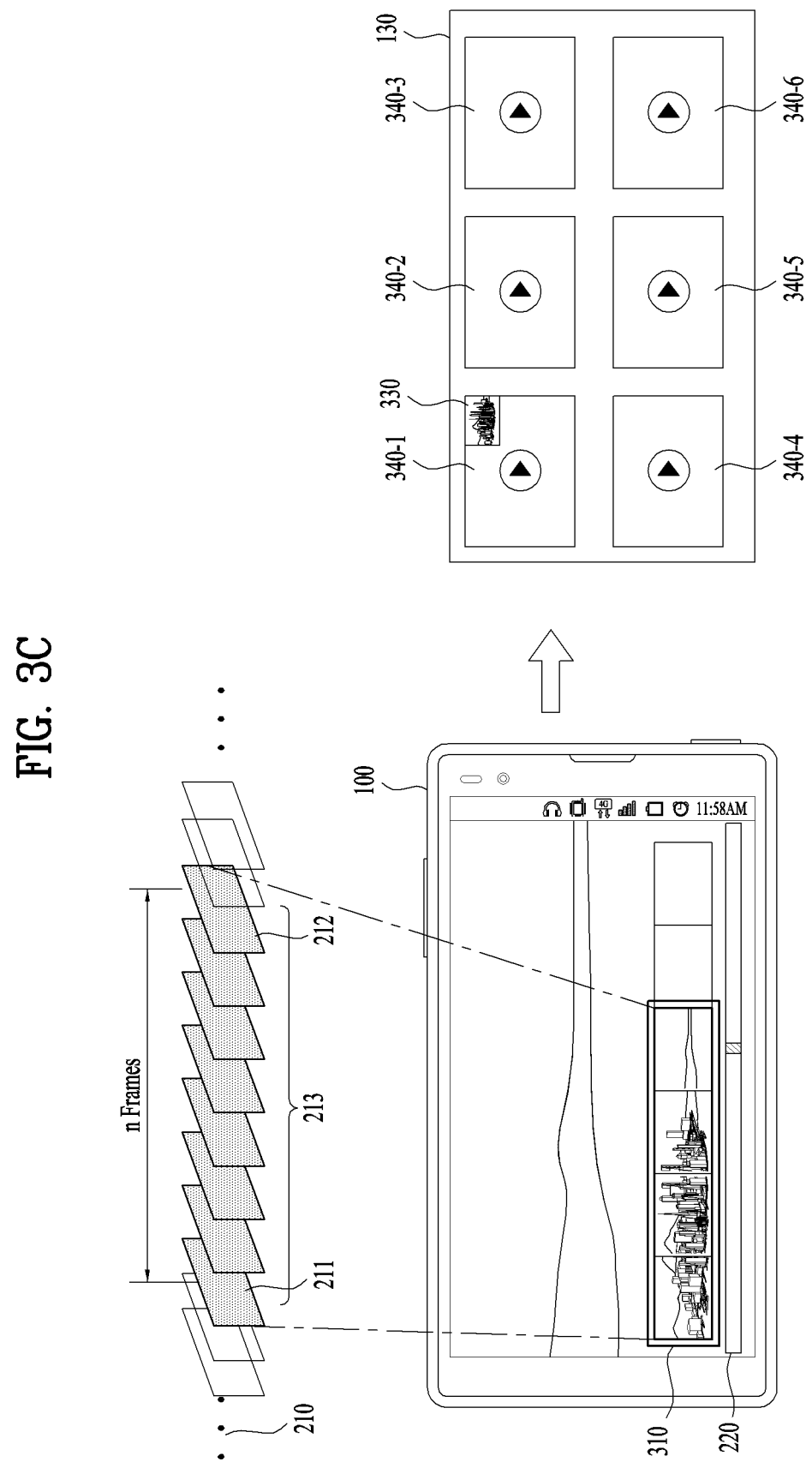

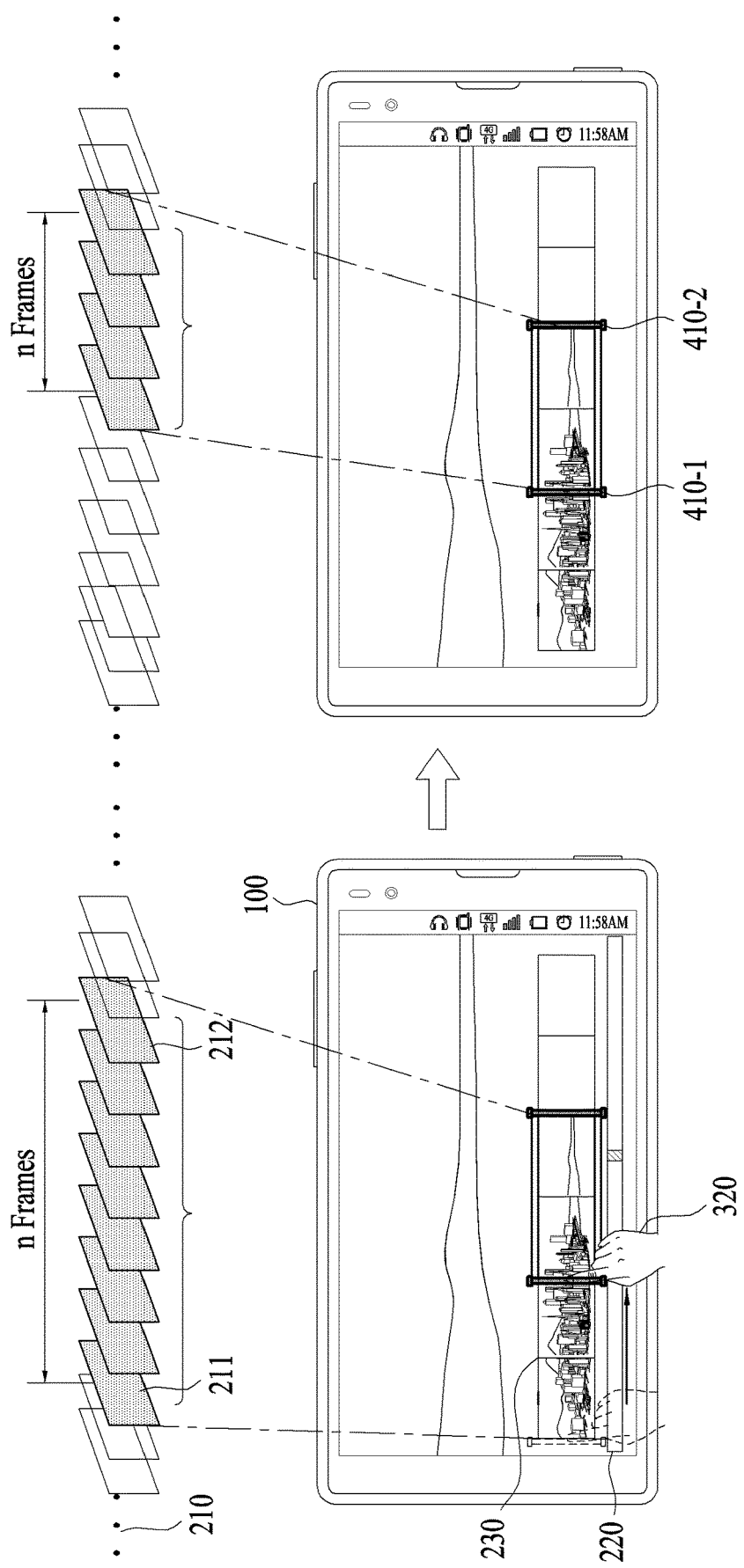

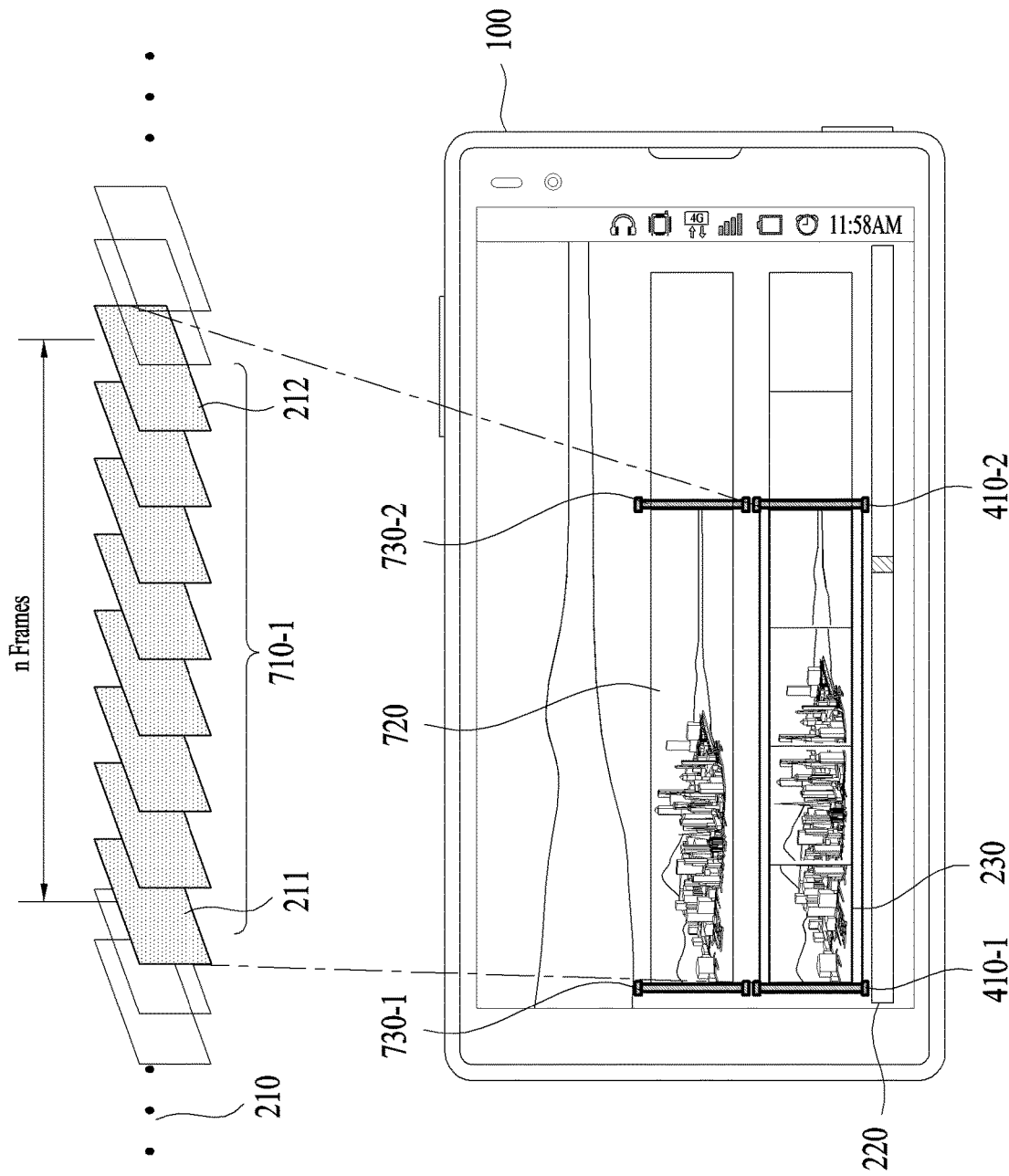

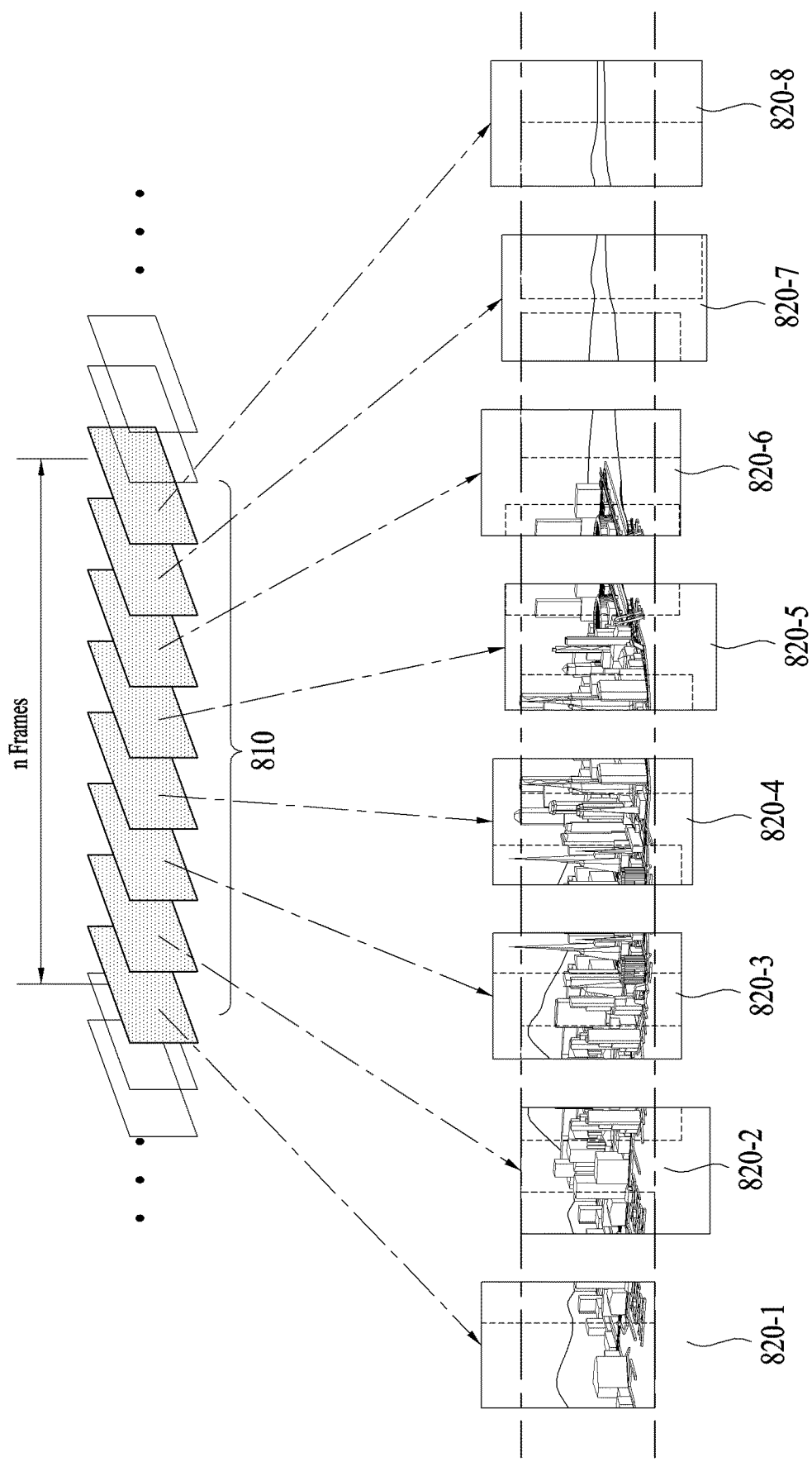

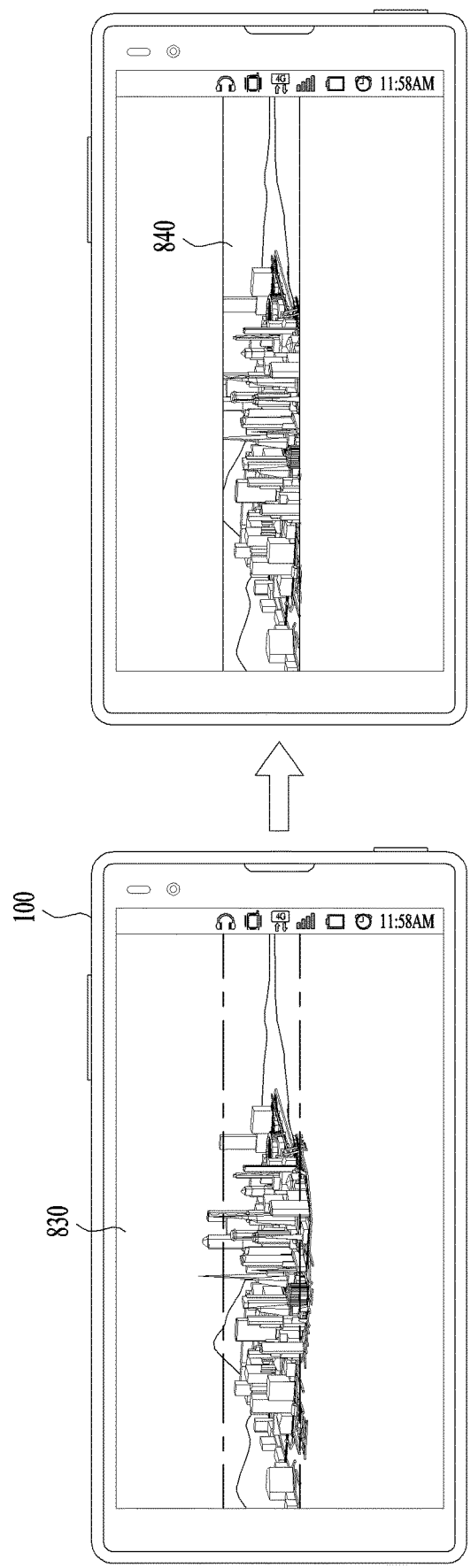

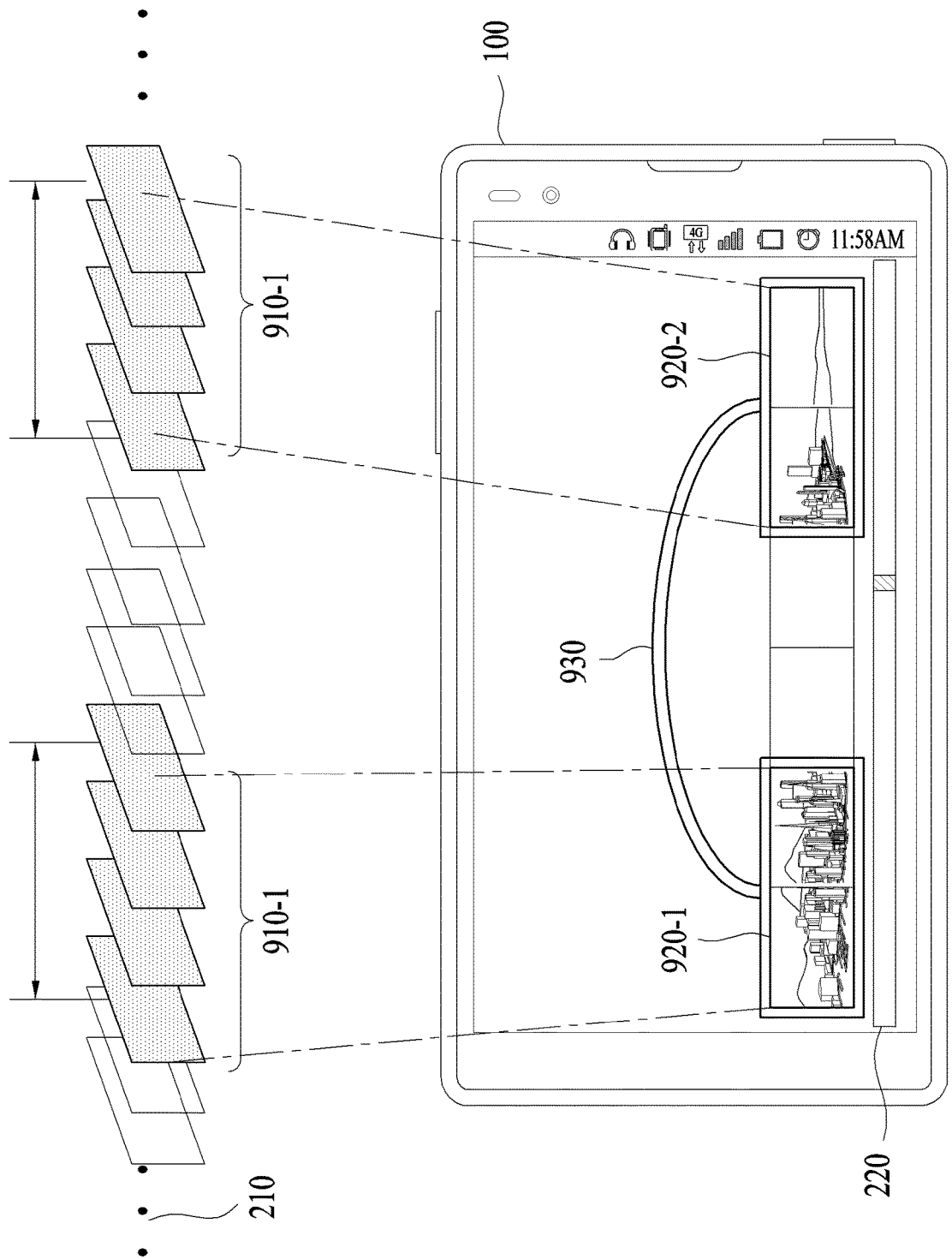

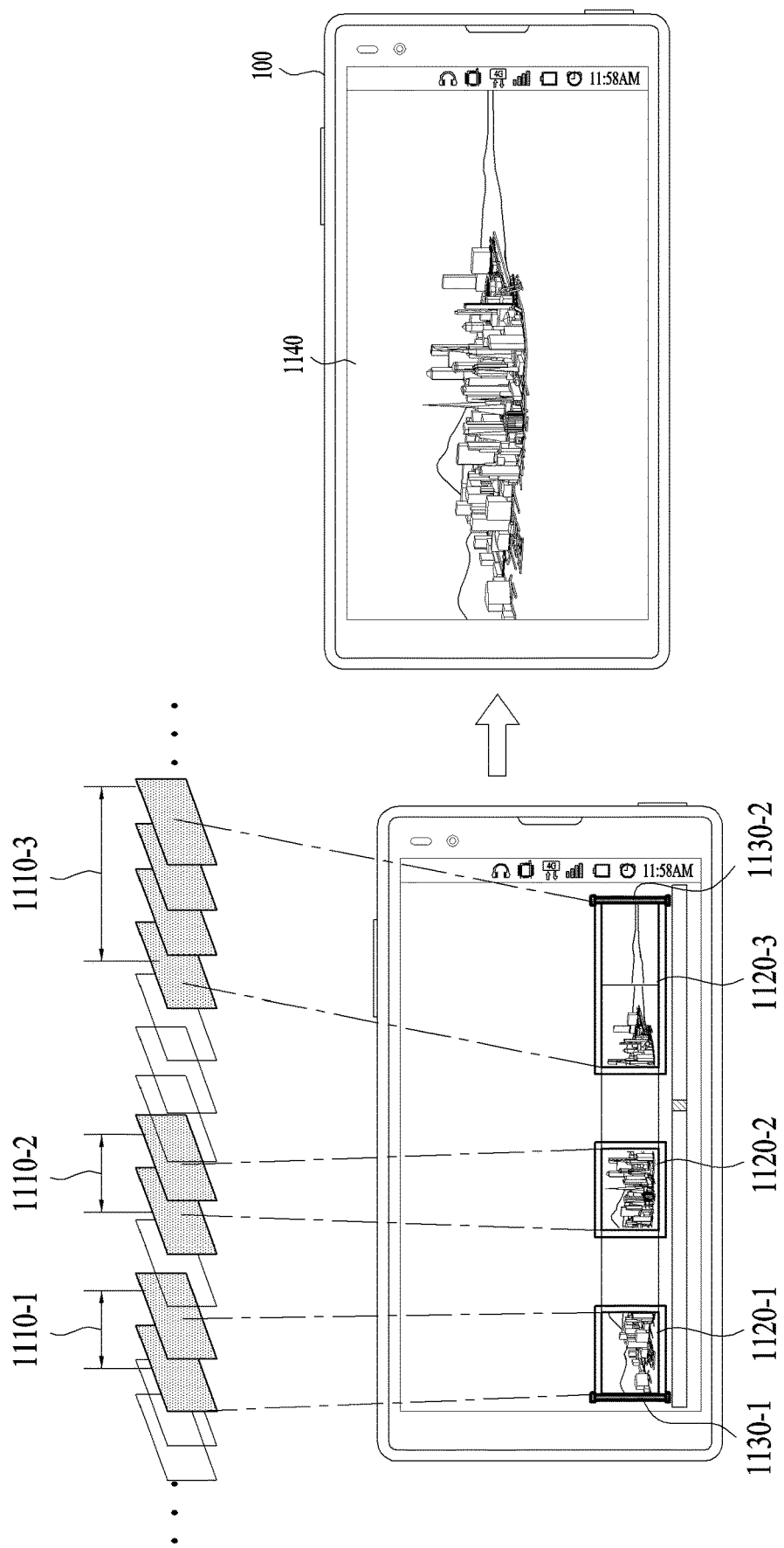

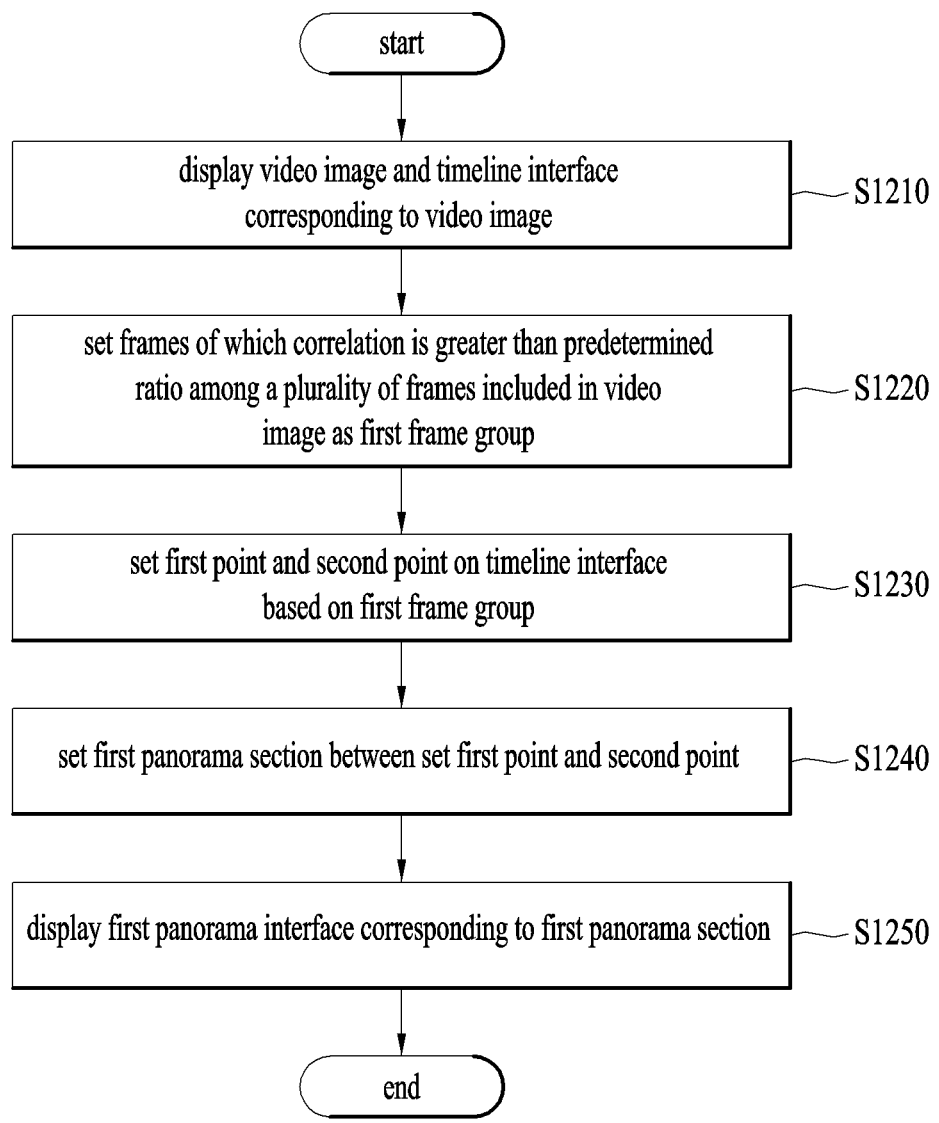

DISPLAY DEVICE AND METHOD OF CONTROLLING THEREFOR

Pursuant to 35 U.S.C. § 119(a), this application claims the benefit of the Korean Patent Application No. 10-2014-0112185, filed on Aug. 27, 2014, which is hereby incorporated by reference as if fully set forth herein.

BACKGROUND OF THE INVENTION

Field of the Invention

The present specification relates to a display device and a method of controlling therefor Discussion of the Related Art A display device captures a video image using a camera and may play the captured video image. The display device may extract an image from the video image captured by the display device. In this case, the display device may extract an image stored in a frame unit from the video image. Yet, a user may have needs to extract images set to a plurality of frames by combining the images into one image. Hence, it is required to have a method for the display device to combine the images with each other in consideration of correlation of the images set to each of a plurality of the frames in the captured video image and a method for the display device to display a combined image.

SUMMARY OF THE INVENTION

Accordingly, the present specification is directed to an apparatus and method thereof that substantially obviate one or more problems due to limitations and disadvantages of the related art.

An object of the present specification is to provide a display device and a method of controlling therefor.

Another object of the present specification is to provide a method for a display device to display a video image and a timeline interface corresponding to the video image.

Another object of the present specification is to provide a method for a display device to set a panorama section based on frames of which correlation is greater than a predetermined ratio among a plurality of frames included in a video image and display a panorama interface.

Another object of the present specification is to provide a method for a display device to display an indicator indicating a range of a panorama section.

Another object of the present specification is to provide a method for a display device to reset a panorama section based on a movement of an indicator and display a panorama interface based on the reset panorama section.

Another object of the present specification is to provide a method for a display device to display a panorama preview image corresponding to a panorama section.

Another object of the present specification is to provide a method for a display device to set a plurality of panorama sections and display a panorama interface in a plurality of the panorama sections.

Another object of the present specification is to provide a method for a display device to display an indicator connecting a plurality of panorama sections with each other.

Another object of the present specification is to provide a method for a display device to generate a panorama image based on a panorama interface.

The other object of the present specification is to provide a method for a display device to include a storage unit and store a video image and a panorama image in the storage unit by combining the video image and the panorama image with each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A display device may be provided according to one embodiment of the present specification. In this case, the display device may include a display unit configured to display a video image and a timeline interface corresponding to the video image, a control input sensing unit configured to detect a control input and deliver the detected control input to a processor and the processor configured to control the display unit and the control input sensing unit. In this case, the processor sets frames of which correlation is greater than a predetermined ratio among a plurality of frames included in the video image as a first frame group, sets a first point and a second point on the timeline interface based on the first frame group, sets a first panorama section between the set first point and the second point and may display a first panorama interface corresponding to the first panorama section.

According to one embodiment of the present specification, a method of controlling a display device includes the steps of displaying a video image and a timeline interface corresponding to the video image, setting frames of which correlation is greater than a predetermined ratio among a plurality of frames included in the video image as a first frame group, setting a first point and a second point on the timeline interface based on the first frame group, setting a first panorama section between the set first point and the second point and displaying a first panorama interface corresponding to the first panorama section.

According to the present specification, a display device may provide a display device and a method of controlling therefor.

According to the present specification, a display device may display a video image and a timeline interface corresponding to the video image.

According to the present specification, a display device sets a panorama section based on frames of which correlation is greater than a predetermined ratio among a plurality of frames included in a video image and may display a panorama interface.

According to the present specification, a display device may display an indicator indicating a range of a panorama section.

According to the present specification, a display device resets a panorama section based on a movement of an indicator and may display a panorama interface based on the reset panorama section.

According to the present specification, a display device may display a panorama preview image corresponding to a panorama section.

According to the present specification, a display device sets a plurality of panorama sections and may display a panorama interface in a plurality of the panorama sections.

According to the present specification, a display device may display an indicator connecting a plurality of panorama sections with each other.

According to the present specification, a display device may generate a panorama image based on a panorama interface.

And, according to the present specification, a display device includes a storage unit and may store a video image and a panorama image in the storage unit by combining the video image and the panorama image with each other.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2a and 2b are diagrams of a method for a display device to set a panorama section and display a panorama interface according to one embodiment of the present specification;

FIGS. 3a to 3c are diagrams of a method for a display device to set a panorama section and display a panorama interface according to one embodiment of the present specification;

FIGS. 5a and 5b are diagrams of a method for a display device to reset a panorama section based on an indicator according to one embodiment of the present specification;

FIGS. 7a and 7b are diagrams of a method for a display device to display a panorama preview image based on an indicator according to one embodiment of the present specification;

FIGS. 8a and 8b are diagrams of a method for a display device to set a panorama section based on correlation of a plurality of frames and obtain a panorama image according to one embodiment of the present specification;

FIG. 9 is a diagram of a method for a display device to display an indicator connecting a plurality of panorama sections according to one embodiment of the present specification;

FIG. 11 is a diagram for a method of configuring a plurality of panorama sections according to one embodiment of the present specification;

FIG. 12 is a flowchart for a method of controlling a display device according to one embodiment of the present specification.

DETAILED DESCRIPTION OF THE INVENTION

While embodiments have been described in detail with reference to the attached drawings and contents written on the drawings, the scope of claims may be non-restricted or non-limited by the embodiments.

Although terms used in the present specification are selected from general terms used currently and widely in consideration of functions, they may be changed in accordance with intentions of technicians engaged in the corresponding fields, customs, advents of new technologies and the like. Occasionally, some terms may be arbitrarily selected by the applicant(s). In this case, the meanings of the arbitrarily selected terms shall be described in the corresponding part of the detailed description of the specification. Therefore, terms used in the present specification need to be construed based on the substantial meanings of the corresponding terms and the overall matters disclosed in the present specification rather than construed as simple names of the terms.

Moreover, a term, each of which includes such an ordinal number as first, second and the like, may be used to describe various components. In doing so, the various components should be non-limited by the corresponding terms, respectively. The terms are only used for the purpose of discriminating one component from other components. For instance, a first component may be named a second component while coming within the scope of the appended claims and their equivalents. Similarly, the second component may be named the first component.

In the present application, such a term as 'comprise', 'include' and the like should be construed not as necessarily excluding various components or steps written in the present specification but as including the components or steps in part or further including additional components or steps. And, such a term as 'unit' written in the present specification indicates a unit processing at least one function or an operation and may be implemented by hardware, software or a combination thereof.

Figure 1:
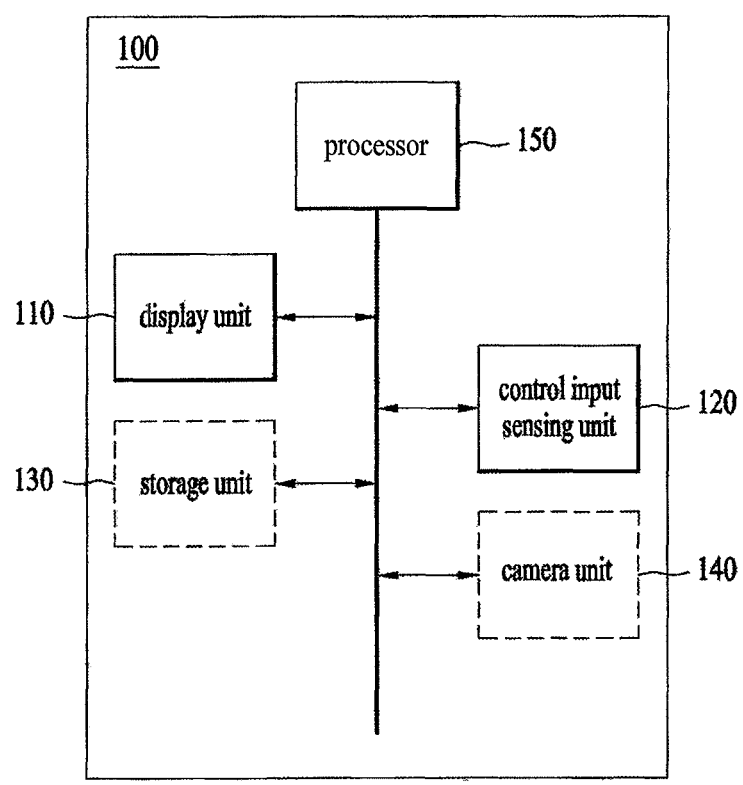
FIG. 1 is a block diagram for a display device according to one embodiment of the present specification.

FIG. 1 is a block diagram for a display device according to one embodiment of the present specification.

A display device 100 may means an electronic device capable of displaying a still image or a video image. More specifically, the display device 100 may correspond to a smartphone, a smart pad, a tablet, a PDA, a notebook or the like. And, the display device 100 may correspond to a device detecting a control input of a user and displaying visual information, by which the present specification may be non-limited.

The display device 100 may include a display unit 110, a control input sensing unit 120 and a processor 150. And, the display device 100 may further include a storage unit 130 as an optional component. And, the display device 100 may further include a camera unit 140 as an optional component. In this case, as an example, each of the units may correspond to a configuration element or a part constructing the display device 100. In particular, each of the units may correspond to an independent unit housed in the display device in order for the display device 100 to execute functions, by which the present specification may be non-limited.

The display unit 110 may be controlled by the processor 150. The display unit 110 may display at least one of a still image and a video image. In this case, the still image may correspond to an image captured by the camera unit 140. And, the video image may correspond to a combination of images contiguously captured by the camera unit 140 for a prescribed time. In this case, the video image may be set by a video sequence. More specifically, the video image may be generated by a combination of a plurality of frames. In this case, images respectively corresponding to a plurality of the frames may be set in a plurality of the frames. In particular, the video image may correspond to a video generated by images continued by a plurality of the frames.

And, according to embodiment, the display unit 110 may include at least one selected from the group consisting of an OLED (organic light-emitting diode), an LCD (liquid crystal display), E-ink, a HMD (head mounted display) and a flexible display. And, as an example, the display unit 110 may correspond to a touch sensitive display unit capable of detecting a touch input as a control input using a touch sensor.

The control input sensing unit 120 may deliver environment recognized by a user input or a device to the processor 150 using at least one sensor installed in the display device 100. More specifically, the control input sensing unit 120 may sense a control input of a user using at least one sensor installed in the display device 100. In this case, the at least one sensing means may include such various sensing means as a touch sensor, a fingerprint sensor, a motion sensor, a proximity sensor, an illumination sensor, a voice recognition sensor, a pressure sensor and the like to sense a control input. The control input sensing unit 120 is a common name of the aforementioned various sensing means. Each of the aforementioned sensors may be included in the device as a separate element. Or, the aforementioned sensors may be included in the device in a manner of being integrated into at least one element. In particular, the control input sensing unit 120 may correspond to a unit configured to sense a control input of a user, by which the present specification may be non-limited. And, as an example, a control input may correspond to a gesture input and may include such various inputs as a contact or a non-contact input. And, the control input may correspond to an input inputted by an input device or an input inputted by a voice or an audio, by which the present specification may be non-limited. And, as an example, the control input sensing unit 120 may correspond to an element integrated with the display unit 110. As an example, the display unit 110 may correspond to a touch sensitive display unit 110.

The display device 100 may further include a storage unit 130 as an optional component. In this case, the storage unit 130 may store various digital data such as a video, an audio, an image, an application and the like. According to the present specification, the storage unit 110 may store a video image and a panorama image. And, as an example, the storage unit 110 may store a program configured to control a controller 140 and may perform a function of temporarily storing input/output data. The storage unit 110 may include such various digital data storage spaces as a flash memory, a RAM (random access memory), an SSD (solid state drive) and the like.

The display device 100 may include a camera unit 140 as an optional component. In this case, the camera unit 140 may sense and capture a still image or a video image. More specifically, the camera unit 140 may sense an image of surrounding environment positioned at the front direction of the display device 100. The camera unit 140 may include an image sensor and the image sensor may convert an optical signal into an electric signal. The camera unit 140 converts the sensed image of the surround environment into an electric signal and may deliver the electric signal to the processor 150.

The processor 150 may correspond to a unit controlling at least one selected from the group consisting of the display unit 110, the control input sensing unit 120 the storage unit 130 and the camera unit 140. More specifically, the processor 150 may display a video image and a timeline interface corresponding to the video image using the display unit 110.

In this case, the video image may correspond to an image captured by the camera unit 140 of the display device 100. And, the video image may correspond to a video image received from an external device by the display device 100 using a communication unit (not depicted). In particular, the video image may correspond to a video played based on contiguous time, by which the present specification may be non-limited.

And, the processor 150 may configure frames of which correlation is greater than a predetermined ratio among a plurality of frames included in a video image as a first frame group. In this case, as mentioned in the foregoing description, the video image may be generated by a combination of a plurality of the frames. And, images may be set to each of a plurality of the frames. In this case, the processor 150 may determine the correlation based on the images set to the each of a plurality of the frames. More specifically, the processor 150 may determine the correlation based on a matched rate of the images set to the each of a plurality of the frames. In this case, the processor 150 may detect a matched region from the images set to the each of a plurality of the frames. In this case, the processor 150 may determine the correlation on the basis of the extent of matching of the aforementioned region. And, as an example, the processor 150 may set a first frame group based on correlation of a partial frame among a plurality of the frames. More specifically, as an example, the processor 150 may detect that a matched rate between a first image displayed on a first frame and a second image displayed on a second frame among a plurality of the frames is greater than a predetermined ratio. And, the processor may detect that a matched rate between a third image displayed on a third frame and the second image displayed on the second frame among a plurality of the frames is greater than the predetermined rate. In this case, as an example, a matched rate between the first image of the first frame and the third image of the third frame may be less than the predetermined ratio. In this case, the processor 150 may set the first frame, the second frame and the third frame as the first frame group based on the second frame. The processor 150 may set frames capable of being connected with each other based on a matched rate of each of images among a plurality of the frames as a first frame group. In particular, the processor 150 determines correlation by comparing the images set to the each of a plurality of the frames included in the video image with each other. And, the processor may set the frames capable of generating a panorama image by being connected with each other as the first frame group, by which the present specification may be non-limited.

And, as an example, the processor 150 may determine a matched rate of images based on a direction of which the images are captured. More specifically, if the processor 150 determines that the matched rate of the images is greater than a predetermined rate, the processor 150 may determine correlation based on a matched direction of images.

And, the processor 150 may set a first point and a second point on a timeline interface based on the aforementioned first frame group. And, the processor 150 may set a first panorama section between the first point and the second point. And, in case that the first panorama section is set, the processor 150 may display a first panorama interface corresponding to the first panorama section using the display unit 110. Regarding this, it shall be described later.

Figure 2B:
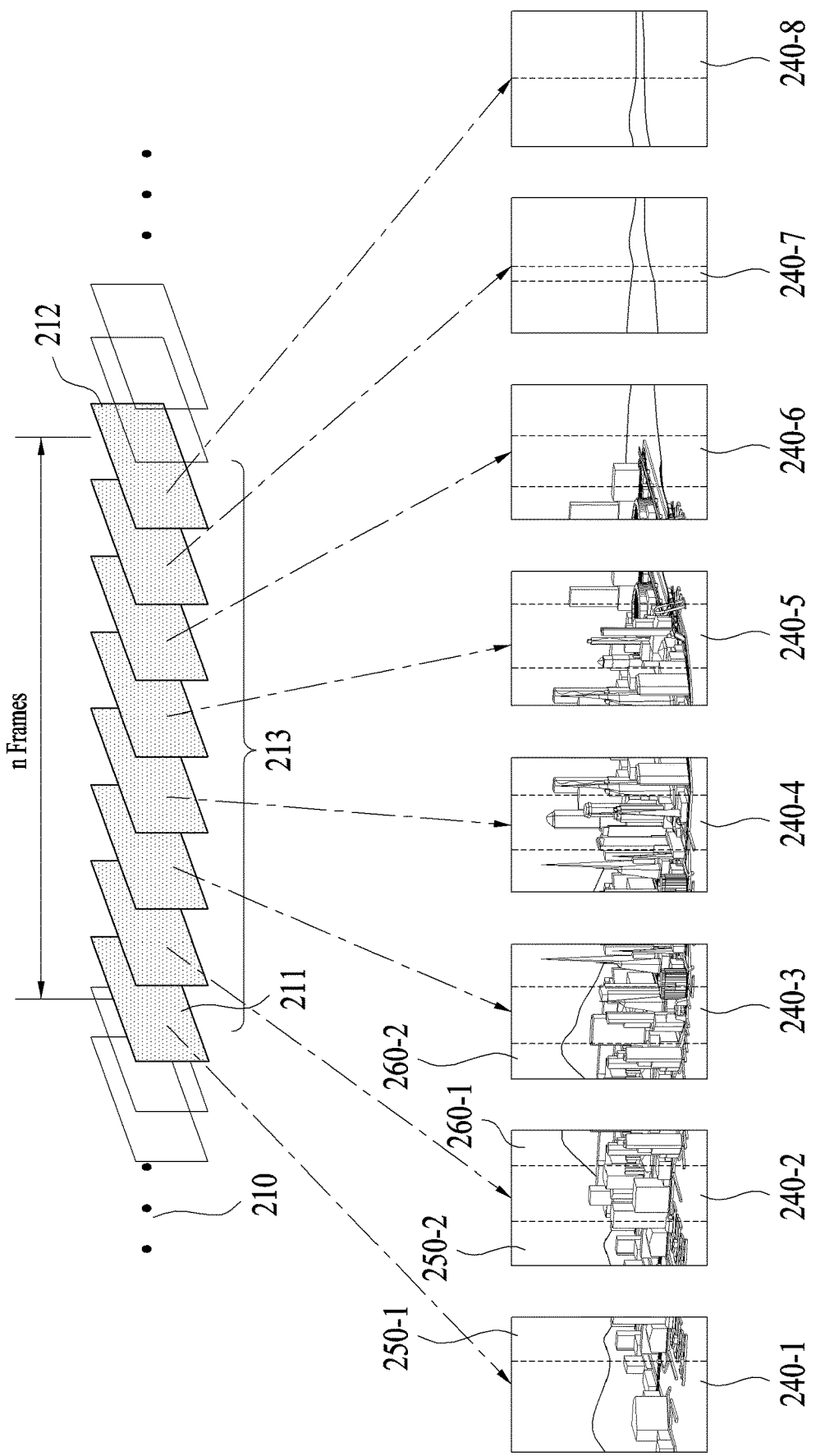

FIGS. 2a and 2b are diagrams of a method for a display device to set a panorama section and display a panorama interface according to one embodiment of the present specification. The display device 100 may display a video image and a timeline interface 220 corresponding to the video image. In this case, the video image may correspond to an image playing a plurality of frames based on a time order. And, the timeline interface 220 may be displayed corresponding to the time order of the video image. In this case, as an example, the display device 100 may display a first panorama interface 230 in the timeline interface 220. In this case, the first panorama interface 230 may correspond to an interface indicating a first panorama section. And, the first panorama section may correspond to a section set based on correlation of a plurality of frames included in the video image.

More specifically, as mentioned in the foregoing description, the display device 100 may set a first frame group based on the correlation of a plurality of the frames included in the video image. In this case, the display device 100 may set contiguous frames in time order among a plurality of the frames included in the first frame group as a first contiguous frame group 213. In particular, the display device 100 may set frames of which a matched rate of images set to a plurality of frames is greater than a predetermined rate and the frames contiguous in a time order as the first contiguous frame group 213. In this case, the display device 100 may set a first panorama section based on the first contiguous frame group. More specifically, the display device 100 may set a first point of the timeline interface 220 as a point corresponding to a first frame 211 included in the video image. In this case, the first frame 211 may correspond to a first appearing frame in a time order among the first contiguous frame group 213. In particular, the first frame 211 may correspond to a firstly played frame among the first contiguous frame group 213. And, the display device 100 may set a second point of the timeline interface 220 as a point corresponding to a second frame 212 included in the video image. In this case, the second frame 212 may correspond to a last appearing frame in a time order among the first contiguous frame group 213. In particular, the second frame 212 may correspond to a lastly played frame among the first contiguous frame group 213. The display device 100 may set a section between the first point corresponding to the first frame 211 and the second point corresponding to the second frame 212 as the first panorama section. And, the display device 100 may display a first panorama interface 230 corresponding to the first panorama section.

In this case, the first contiguous frame group 213 may include a plurality of frames. More specifically, a plurality of the frames from the first frame 211 to the second frame 212 may be included in the first contiguous frame group 213. In this case, as an example, referring to FIG. 2b, correlation of a plurality of the frames included in the first contiguous frame group 213 may be greater than a predetermined ratio. In this case, as an example, a matched rate between a first image 240-1 set to the first frame 211 and a third image 240-2 set to a third frame corresponding to a next frame of the first frame 211 may be greater than the predetermined ratio. In this case, as an example, the display device 100 may determine the matched rate between the first image 240-1 and the third image 240-2 based on a direction moving to the right. And, a matched rate between the third image 240-2 set to the third frame and a fourth image set to a fourth frame corresponding to a next frame of the third frame may be greater than the predetermined ratio. Similar to this, correlation between a plurality of the frames included in the first contiguous frame group 213 and a frame adjacent to a plurality of the frames in time order may be greater than a predetermined ratio. In particular, the display device 100 sets frames of which the correlation with an adjacent frame is greater than the predetermined ratio and the frames contiguous with each other in time order as the first contiguous frame group 213. The display device may set a first panorama section corresponding to the first contiguous frame group 213.

Figure 3B:
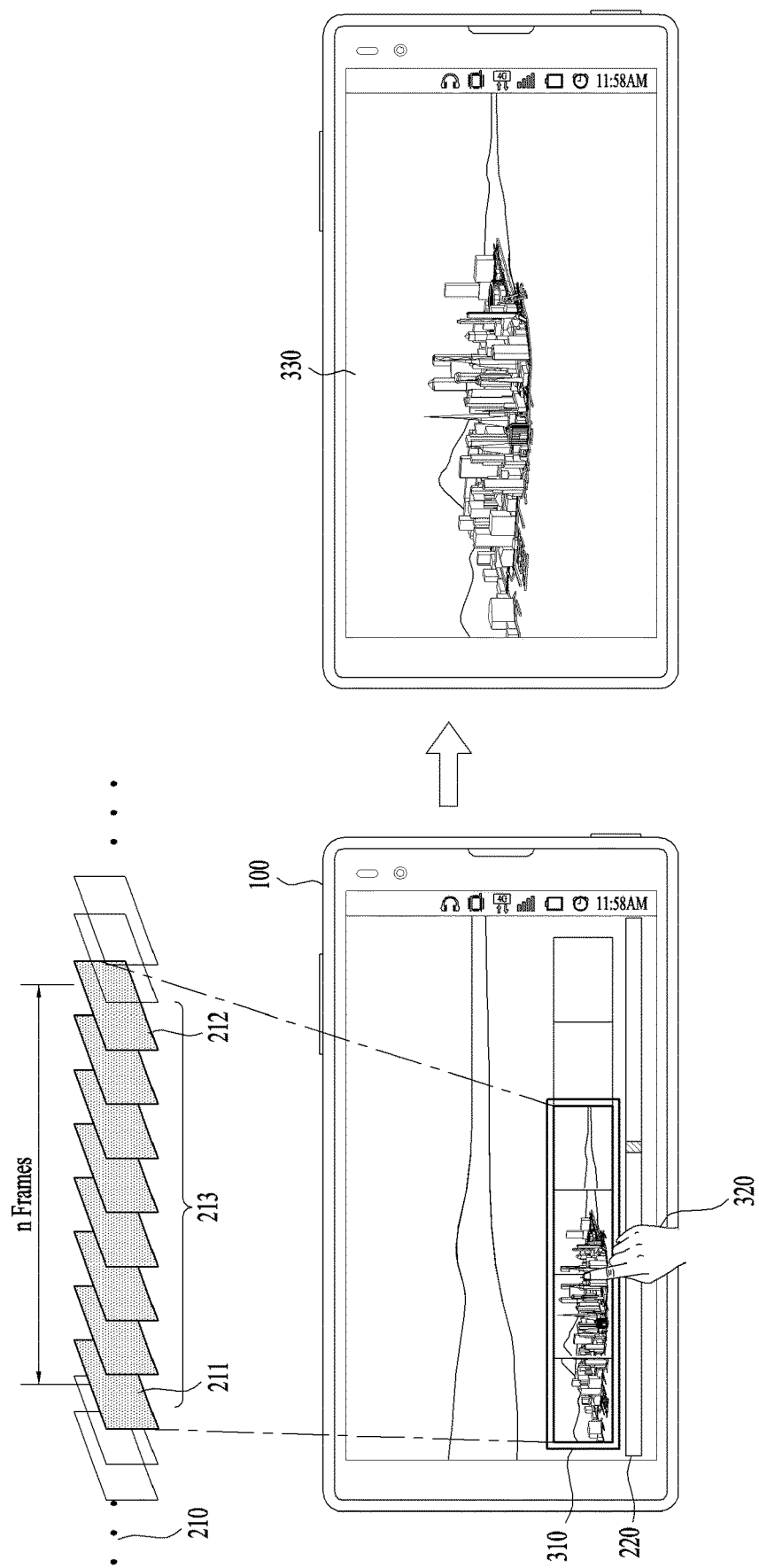

FIGS. 3a to 3c are diagrams of a method for a display device to set a panorama section and display a panorama interface according to one embodiment of the present specification.

Referring to FIG. 3a, as mentioned in the foregoing description, the display device 100 may set a section between a first point and a second point on the timeline interface 220 as a first panorama section 310. In this case, as an example, the display device 100 may detect a user input selecting the timeline interface 220 using the control input sensing unit 120. In this case, the display device 100 may display a first panorama interface 230 in the timeline interface 200 corresponding to the first panorama section 310. In particular, if a control input 320 of a user selecting the timeline interface 220 is detected, the display device 100 may display the first panorama interface 230.

And, referring to FIG. 3b, the display device may detect a control input 320 of the user selecting the first panorama interface 230. In this case, the display device may generate a first panorama image 330 based on the first panorama section 310. And, as an example, the display device 100 may display the generated first panorama image 330. In this case, as an example, the display device 100 may generate the first panorama image 330 by combining images set to each of frames included in the first contiguous frame group 213 corresponding to the first panorama section 310 with each other. In this case, as an example, the display device 100 may detect an overlapped region between the images set to the frames contiguous in time order in the first contiguous frame group 213. The display device 100 may generate the first panorama image 330 by combining the images set to the frames contiguous in time order with each other based on the aforementioned overlapped region.

And, referring to FIG. 3c, the display device 100 may detect a control input 320 of a user selecting the first panorama interface 230. In this case, the display device 100 may generate a first panorama image 330. In this case, the display device 100 may store the first panorama image 330 in the storage unit 130. And, the display device 100 combines the first panorama image and a video image with each other and may store it in the storage 130. In particular, the display device 100 may store the first panorama image 330 in relation to the video image, by which the present specification may be non-limited.

Figure 4:
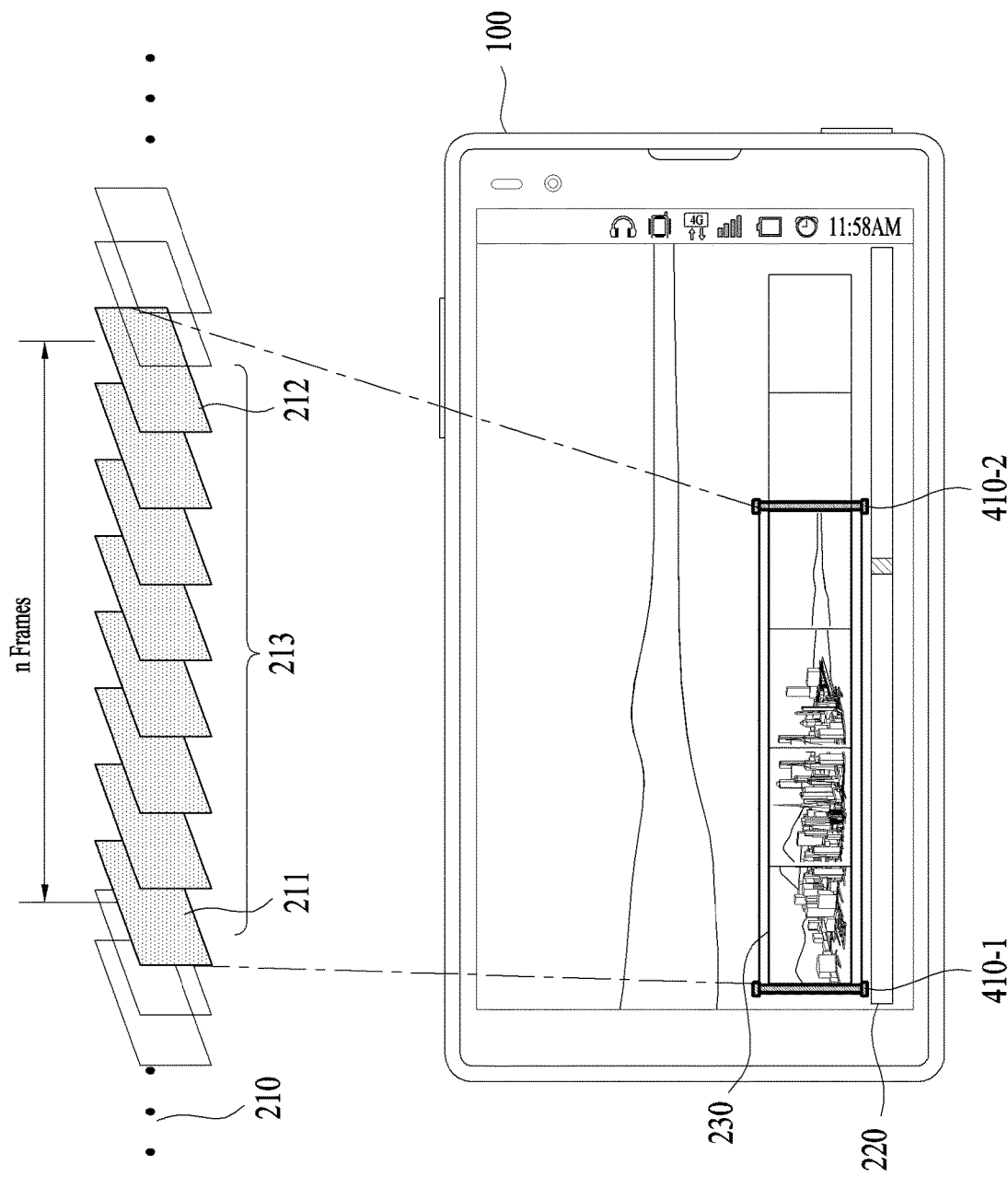
FIG. 4 is a diagram of a method for a display device to display an indicator in a panorama interface according to one embodiment of the present specification.

FIG. 4 is a diagram of a method for a display device to display an indicator in a panorama interface according to one embodiment of the present specification.

The display device 100 may display a first indicator 410-1 and a second indicator 410-2 in both ends of a first panorama section 330. In this case, the first indicator 410-1 may be set to a position corresponding to a start point of the first panorama section. And, the second indicator 410-2 may be set to a position corresponding to a last point of the first panorama section. And, as an example, the first indicator 410-1 and the second indicator 410-2 are capable of being moved on the timeline interface 220. More specifically, the first indicator 410-1 and the second indicator 410-2 may correspond to indicators indicating a point to which the first panorama section is set on the timeline interface 220. And, as an example, the first indicator 410-1 and the second indicator 410-2 may correspond to a form of which the first indicator 410-1 and the second indicator 410-2 are combined with the first panorama interface 200. In particular, if the first indicator 410-1 or the second indicator 410-2 moves, the display device 100 may display the first panorama interface 220 based on the moved first indicator 410-1 or the moved second indicator 410-2. Regarding this, it shall be described with reference to FIG. 5*a* and FIG. 5*b* in the following.

Figure 5B:
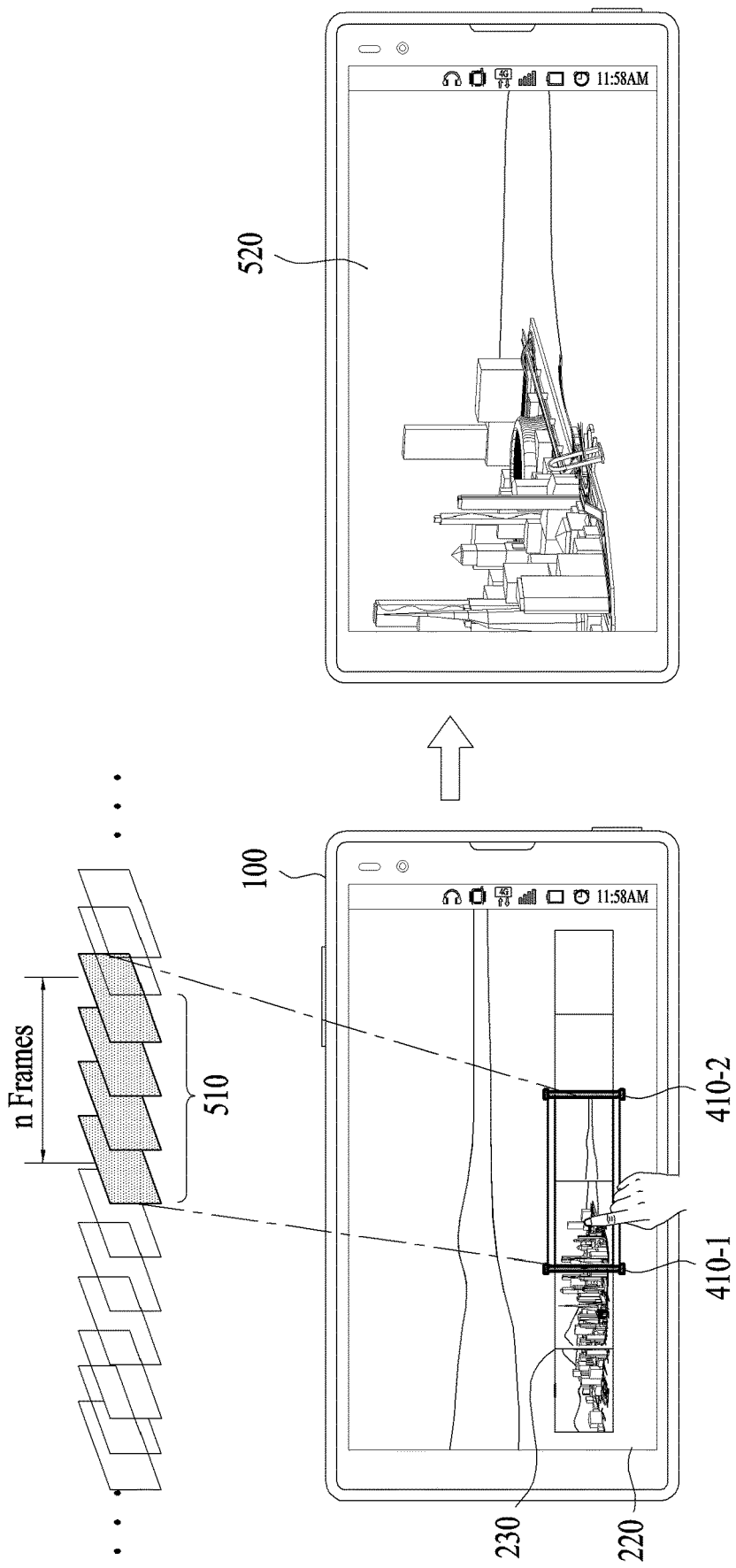

FIGS. 5*a* and 5*b* are diagrams of a method for a display device to reset a panorama section based on an indicator according to one embodiment of the present specification. If at least one of a first indicator 410-1 and a second indicator 410-2 moves between a first point and a second point, the display device 100 may reset a first panorama section. More specifically, as mentioned in the foregoing description, the display device 100 may set a point corresponding to a first frame, which is a first frame 211 of a first contiguous frame 213, as a first point. And, the display device 100 may set a point corresponding to a second frame, which is a last frame 212 of the first contiguous frame 213, as a second point. In particular, a section between the first point and the second point on a timeline interface 220 may correspond to the first contiguous frame 213. In this case, if at least one of the first indicator 410-1 and the second indicator 410-2 moves between the first point and the second point, the display device 100 may reset a first panorama section. And, the display device 100 may display a first panorama interface 230 corresponding to the first panorama section.

More specifically, referring to FIG. 5*a*, the first indicator 410-1 may move from the first point to a third point on the timeline interface 220. In this case, the third point may correspond to a point between the first point and the second point. In this case, the display device 100 may set a section between the third point and the first point as a first panorama section. In this case, the first panorama section may correspond to a section corresponding to contiguous frames from a third frame corresponding to the third point to a second frame corresponding to the second point. And, the display device 100 may display a first panorama interface 230 corresponding to the reset first panorama section. In particular, the first panorama interface 230 may be displayed between the third point and the second point. In this case, the display device 100 may detect a control input selecting the reset first panorama section.

More specifically, referring to FIG. 5*b*, the display device 100 may detect a control input selecting the first panorama section reset between the third point and the second point. In this case, the display device 100 may generate a first panorama image 520. In this case, as an example, the first panorama image 520 may correspond to a panorama image corresponding to a section between the third point and the second point. In particular, the display device 100 may generate the first panorama image by combining images contiguous from a third image set to the third frame to a second image set to the second frame with each other.

Figure 6A:
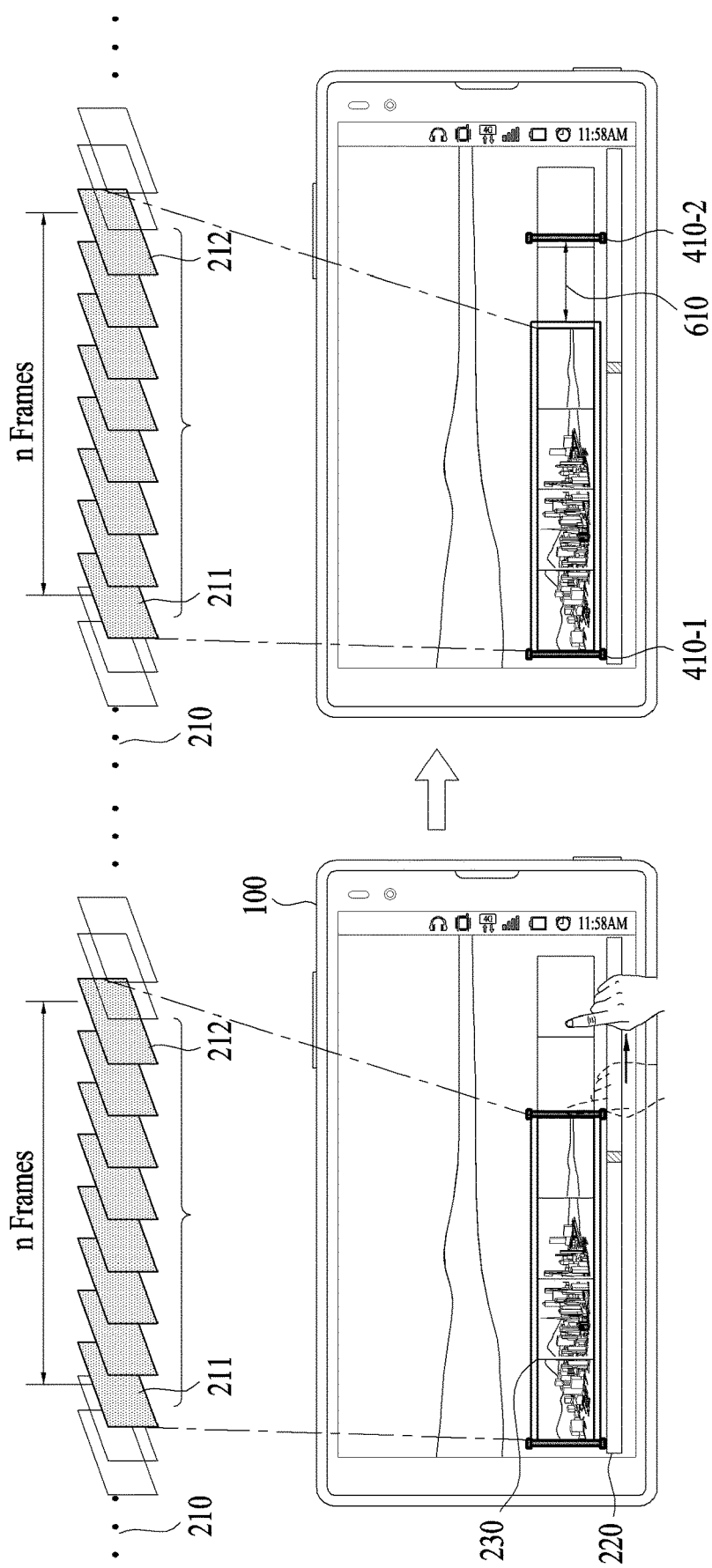
FIGS. 6a and 6b are diagrams of a method for a display device to reset a panorama section based on an indicator according to one embodiment of the present specification.
Figure 6B:
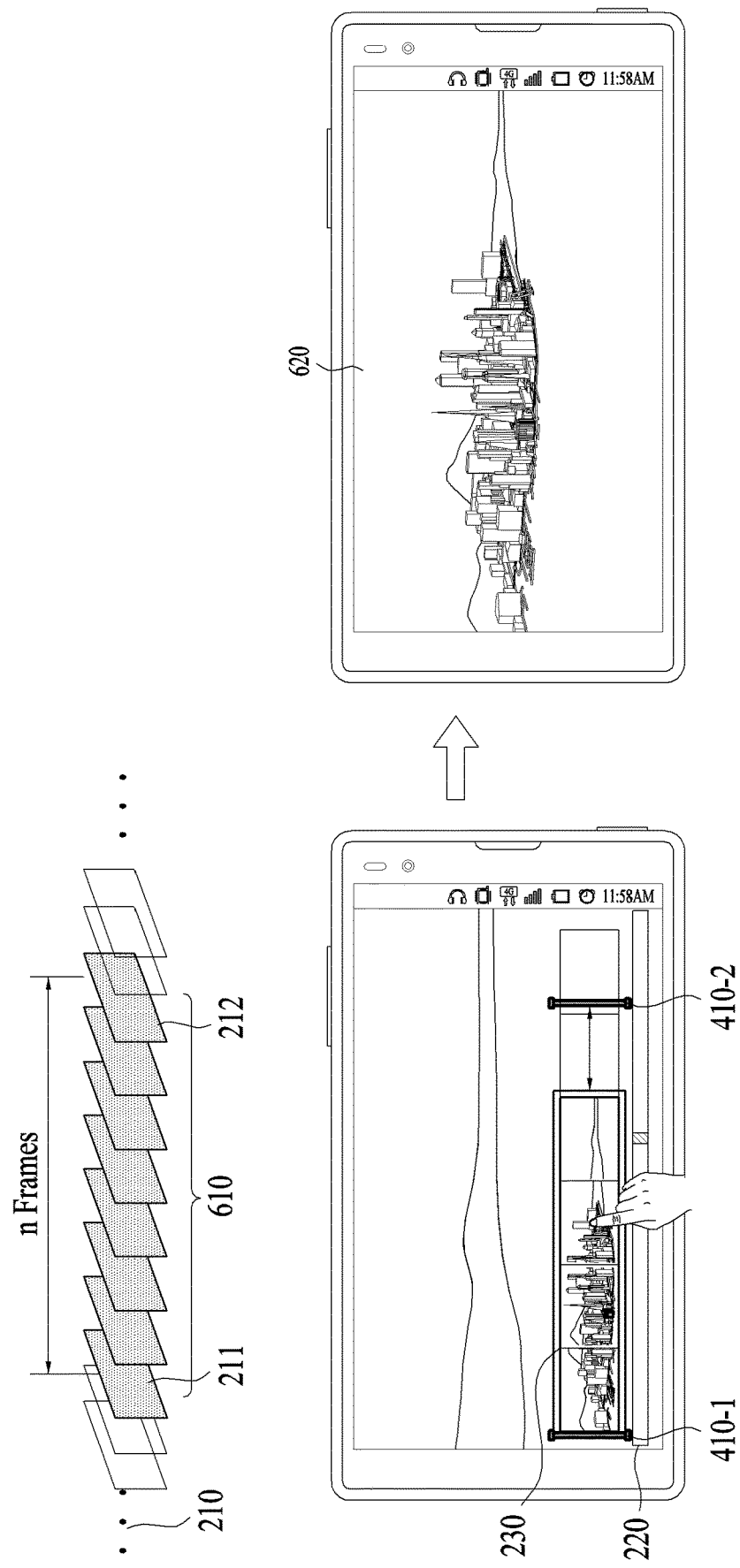

FIGS. 6*a* and 6*b* are diagrams of a method for a display device to reset a panorama section based on an indicator according to one embodiment of the present specification. If at least one of a first indicator 410-1 and a second indicator 410-2 moves outside a section between a first point and a second point, the display device 100 may further display a third indicator 610. In this case, the third indicator 610 may correspond to an indicator indicating a section to which a first panorama section is not set.

More specifically, referring to FIG. 6*a*, the display device 100 may set a first frame of a first contiguous frame group 213 as a first frame 211. In this case, the first frame 211 may correspond to a first point on a timeline interface 220. And, the display device may set a last frame of the first contiguous frame group 213 as a second frame 212. In this case, the second frame 212 may correspond to a second point on the timeline interface 220. In this case, as an example, the second indicator 410-2 may move to a fourth point corresponding to a point positioned at the outside of a section between the first point and the second point. In this case, the display device 100 may display a third indicator 610 based on the second point and the fourth point. In this case, the fourth point may correspond to a fourth frame of a video image. In this case, the fourth frame may correspond to a frame not included in the first contiguous frame group. In particular, correlation between the fourth frame and the frames included in the first contiguous frame group may be less than a predetermined ratio. In this case, the display device 100 may not generate a panorama image using a fourth image displayed on the fourth frame. And, as an example, the second point may correspond to a point corresponding to the second frame, which is the last frame of the first contiguous frame group 213. Hence, the display device 100 may not generate a panorama image for a section from a fifth frame, which is a next frame contiguous with the second frame in time order, to the fourth frame. The display device 100 may indicate that the first panorama image is unable to be generated by displaying the third indicator 610.

In this case, referring to FIG. 6*b*, the display device may detect a control input selecting a first panorama section set by a section between the first point and the second point. In this case, the display device 100 may generate a first panorama image 620. In this case, as an example, the first panorama image 520 may correspond to a panorama image corresponding to the section between the first point and the second point. In particular, if the second indicator 410-2 moves outside the section between the first point and the second point, the display device 100 may generate the first panorama image corresponding to the first contiguous frame group 213.

Figure 7B:
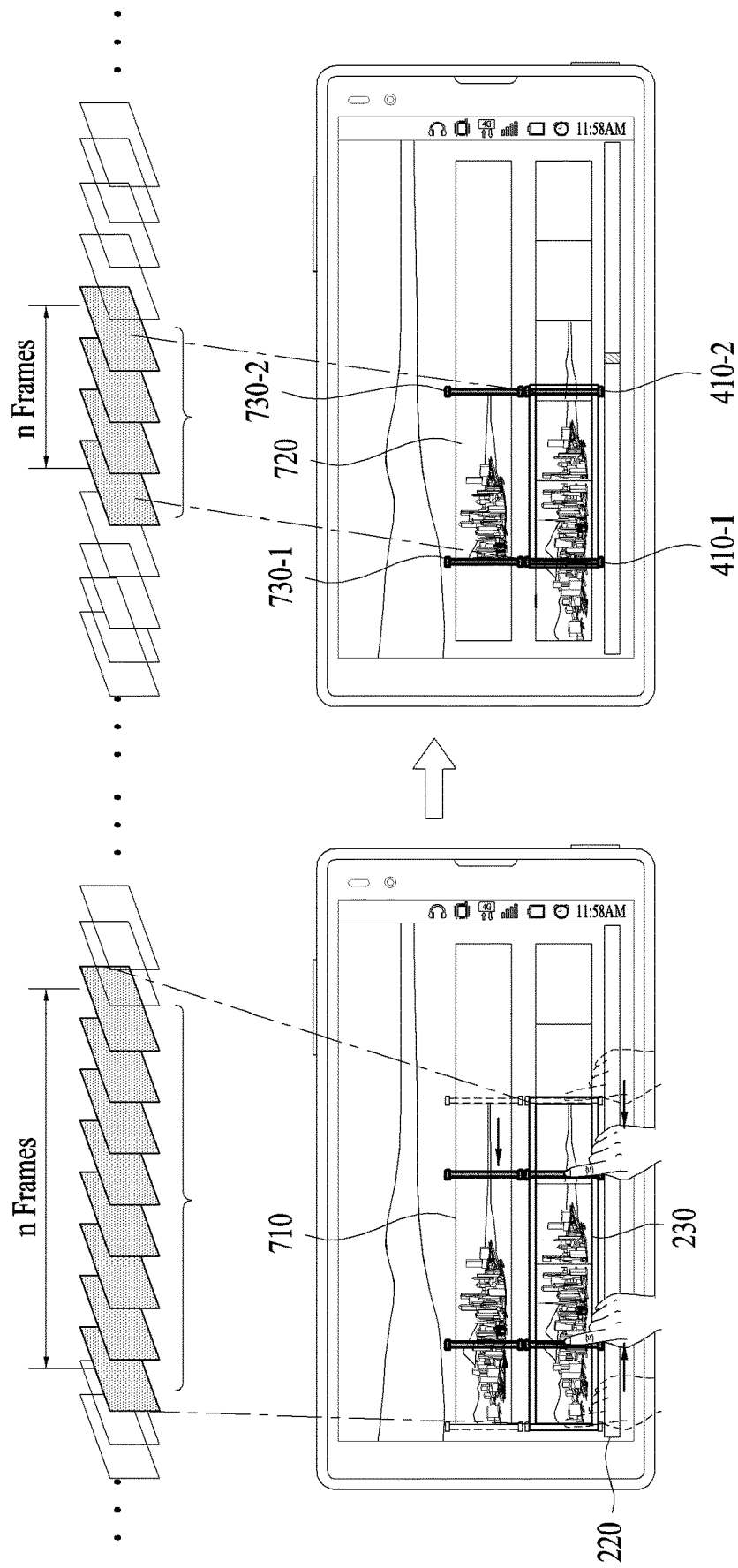

FIGS. 7*a* and 7*b* are diagrams of a method for a display device to display a panorama preview image based on an indicator according to one embodiment of the present specification. The display device 100 may further display an image interface 710. In this case, the image interface 710 may correspond to an interface on which a preview image of a first panorama image is displayed. More specifically, the display device 100 may generate the first panorama image based on a first panorama interface 230. In this case, the display device may display a preview image for the generated first panorama image. In particular, the display device 100 may preferentially display the preview image 720 of the first panorama image on the image indicator 710. In this case, as an example, if the display device 100 detects a control input selecting the preview image 720 of the first panorama image, the display device 100 may generate the first panorama image using a first contiguous frame group 213. And, as an example, if at least one of a first indicator 410-1 and a second indicator 410-2 moves to a section between a first point and a second point, the display device 100 may reduce a size of the preview image 720 of the first panorama image. And, if at least one of the first indicator 410-1 and the second indicator 410-2 moves outside the section between the first point and the second point, the display device 100 may maintain the size of the preview image 720 of the first panorama image. In particular, the display device 100 may control the size of the preview image of the first panorama image when the indicator 410-1/410-2 moves to the section between the first point and the second point only. And, as an example, the display device 100 may further display a first image indicator 730-1 and a second image indicator 730-2 on the image interface 710. In this case, the first image indicator 730-1 may correspond to the first indicator 410-1. And, the second image indicator 730-2 may correspond to the second indicator 410-2. In this case, as an example, if the first indicator 410-1 moves, the display device 100 may move the first image indicator 730-1 together with the first indicator. And, as an example, if the second indicator 410-1 moves, the display device 100 may move the second image indicator 730-2 together with the second indicator.

FIGS. 8a and 8b are diagrams of a method for a display device to set a panorama section based on correlation of a plurality of frames and obtain a panorama image according to one embodiment of the present specification. The display device 100 may generate a first panorama image using a plurality of frames included in a first contiguous frame group 810. In this case, as an example, the display device 100 may generate the first panorama image 840 based on a direction to which images are combined. In this case, the display device 100 may generate the first image by combining the images set to each of a plurality of the frames included in the first contiguous frame group 810 with each other. In this case, a partial region of the first image may be eliminated from the first image based on a first boundary. And, the first panorama image 840 may be generated by eliminating a partial region of the first image from the first image based on a second boundary.

More specifically, referring to FIG. 8a, the display device 100 may detect a overlapped region between a first image 820-1 of a first frame corresponding to a first frame of a first contiguous frame group 810 and a second image 820-2 of a second frame corresponding to a next frame of the first frame. In this case, the display device 100 may combine the first image 820-1 and the second image 820-2 with each other based on the overlapped region. In this case, the first image 820-1 and the second image 820-2 may be combined with each other based on a right direction. In particular, since the display device 100 combines the images with each other based on the right direction, the overlapped region of the images may be determined on the basis of the right direction. In this case, a combined image of the first image 820-1 and the second image 820-2 may not have a form of a rectangle. In particular, a top boundary and a bottom boundary may be set to be different from each other. And, a first image may be generated using an identical way by combining images set to each of a plurality of frames included in the first contiguous frame group 810 with each other. In this case, the first image may have boundaries different from each other which are set based on each overlapped region of a plurality of the frames. In this case, the display device 100 may eliminate a partial region of the first image from the first image based on a first boundary. In this case, the first boundary may correspond to a boundary of the first image positioned on a center point of the first image. In this case, the first boundary may correspond to a boundary nearest from the center point of the first image. The display device 100 may generate an image combined in the right direction by eliminating a partial region of the first image from the first image on the basis of the first boundary. And, the display device 100 may eliminate a partial region of a second image from the second image based on a second boundary. In this case, the second boundary may correspond to a boundary of the first image positioned at the bottom of a center point of the second image. In this case, the second boundary may correspond to a boundary nearest from the center point of the first image. In particular, the display device 100 eliminates a partial region of the first image based on the first boundary and the second boundary and may be then able to generate a first panorama image 840.

FIG. 9 is a diagram of a method for a display device to display an indicator connecting a plurality panorama sections according to one embodiment of the present specification. The display device 100 may set frames of which correlation is greater than a predetermined ratio among a plurality of frames included in a video image as a first frame group. In this case, the display device 100 may set contiguous frames among the first frame group as a first contiguous frame group 910-1. And, the display device 100 may set contiguous frames among the first frame group as a second contiguous frame group 910-2. In this case, the display device 100 may set a first panorama section based on the first contiguous frame group 910-1. And, the display device 100 may display a first panorama interface 920-1 corresponding to the first panorama section. And, the display device 100 may set a second panorama section based on the second contiguous frame group 910-2. And, the display device 100 may display a second panorama interface 920-2 based on the second panorama section. In this case, as an example, if the first panorama section and the second panorama section are capable of being connected with each other, the display device 100 may set the first panorama interface 920-1 and the second panorama interface 920-2 to have an identical interface property. In this case, the interface property may include at least one selected from the group consisting of light and shade, color and size. In particular, if the first panorama section and the second panorama section are capable of being connected with each other, the display device 100 may display the first panorama interface 920-1 and the second panorama interface 920-2 in a manner that the first panorama interface and the second panorama interface are correlated with each other. In this case, the display device 100 may generate a first panorama image based on the first panorama section. And, the display device 100 may generate a second panorama image based on the second panorama section. In this case, if a matched rate between the first panorama image and the second panorama image is greater than a predetermined ratio, the display device 100 may detect it as the first panorama section and the second panorama section are capable of being connected with each other. And, as an example, if the first panorama section and the second panorama section are capable of being connected with each other, the display device 100 may further display a first indicator 930 connecting the first panorama interface 920-1 and the second panorama interface 920-2 with each other.

Figure 10A:
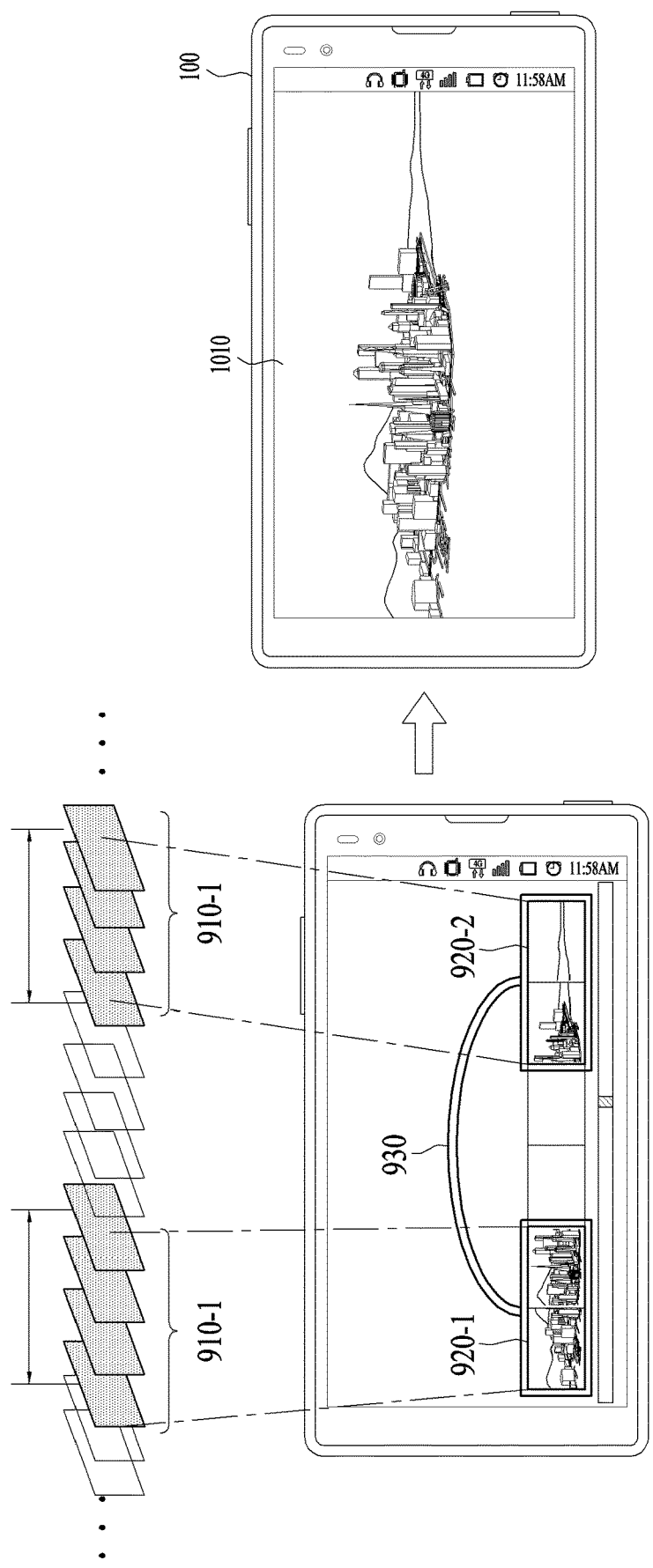
FIGS. 10a and 10b are diagrams of a method for a display device to set a panorama section based on a control input selecting an indicator according to one embodiment of the present specification.
Figure 10B:
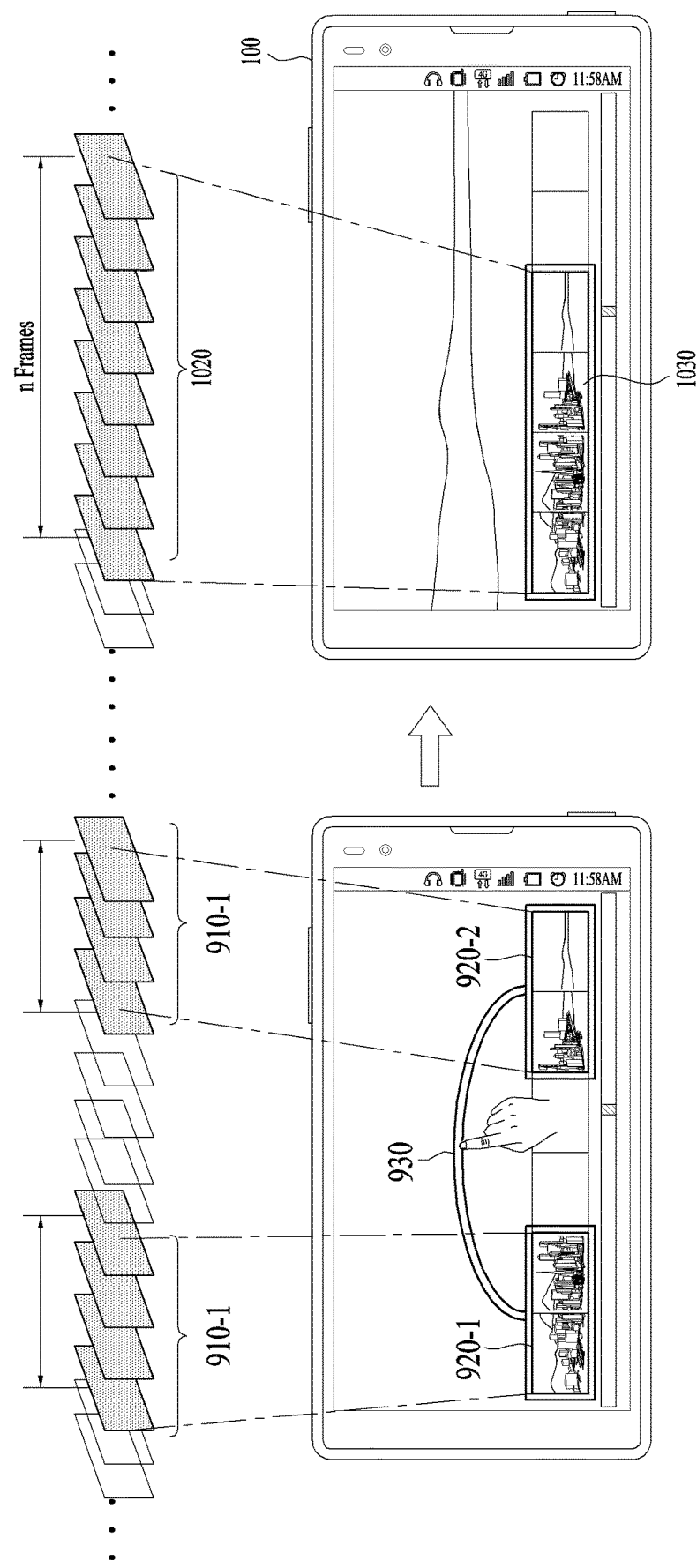

FIGS. 10a and 10b are diagrams of a method for a display device to set a panorama section based on a control input selecting an indicator according to one embodiment of the present specification. The display device 100 may detect a control input selecting a first indicator 930. In this case, the display device 100 may generate a third panorama image 1010 by combining a first panorama image generated in a first panorama section and a second panorama image generated in a second panorama section with each other. In this case, as an example, the display device 100 may display the third panorama image 1010.

And, as an example, if the display device 100 detects a control input selecting the first indicator 930, the display device 100 may set a third panorama section by connecting the first panorama section and the second panorama section with each other. In this case, the display device 100 may further display a third panorama interface 1030 corresponding to the third panorama section. In this case, as an example, when the display device 100 sets the third panorama section, the display device 100 may eliminate a frame set between the first panorama section and the second panorama section from a video image. More specifically, the first panorama section may be configured between a first point and a second point. And, the second panorama section may be set between a third point and a fourth point. In this case, if the first panorama section and the second panorama section are capable of being connected with each other, the display device 100 may eliminate frames from a second frame corresponding to the second point to a third frame corresponding to the third point from a video image. In particular, the display device 100 eliminates frames incapable of being connected with each other and may set a third panorama section.

FIG. 11 is a diagram for a method of configuring a plurality of panorama sections according to one embodiment of the present specification. The display device may set frames of which correlation is greater than a predetermined ratio among a plurality of frames of a video image as a first frame group. In this case, the display device 100 may display a panorama interface 1120-1/1120-2/1120-3 for the first frame group. In this case, as an example, the panorama interface 1120-1/1120-2/1120-3 may correspond to a plurality of interfaces indicating all frames included in the first frame group. In particular, although the frames of which correlation is greater than the predetermined ratio are not contiguous with each other in time order, the display device 100 may display the frames with the panorama interfaces. In this case, as an example, the display device 100 may set a first point to a point corresponding to a first frame, which has top priority in time order among the frames included in the first frame group. In particular, the first frame may correspond to a firstly played frame in case of playing a video image. And, the display device 100 may set a second point to a point corresponding to a second frame, which has lowest priority in time order among the frames included in the first frame group. In particular, the second frame may correspond to a lastly played frame in case of playing a video image. In this case, the display device 100 sets a plurality of panorama sections between the first point and the second point and may display a plurality of panorama interfaces 1120-1/1120-2/1120-3. And, as an example, the display device 100 may further display a first indicator 1130-1 corresponding to the first point. And, the display device 100 may further display a second indicator 1130-2 corresponding to the second point. By doing so, the display device 100 may display a start point and an end point of a panorama section. And, as an example, the display device may detect a control input selecting at least one of the panorama interfaces 1120-1/1120-2/1120-3. In this case, the display device 100 may generate a panorama image using images included in each of a plurality of the frames included in the first frame group.

FIG. 12 is a flowchart for a method of controlling a display device according to one embodiment of the present specification.

The display device 100 may display a video image and a timeline interface corresponding to the video image [S1210]. In this case, as mentioned earlier in FIG. 1, the display device 100 may display the video image and the time interface corresponding to the video image using a display unit 110. In this case, the video image may correspond to a combination of images contiguously captured by a camera unit 140 for a prescribed time. In this case, the video image may be set by a video sequence. More specifically, the video image may be generated by a combination of a plurality of frames. In this case, images may be set to a plurality of the frames, respectively. In particular, the video image may correspond to a video generated by the images which are contiguous with each other by a plurality of the frames.

Subsequently, the display device 100 may set frames of which correlation is greater than a predetermined ratio among a plurality of the frames included in the video image as a first frame group [S1220]. In this case, as mentioned earlier in FIG. 1, the video image may be generated by a combination of a plurality of the frames. And, images may be set to each of a plurality of the frames. In this case, the display device 100 may determine correlation based on the images set to the each of a plurality of the frames. More specifically, the display device may determine the correlation based on a matched rate of the images set to the each of a plurality of the frames. In this case, the display device 100 may detect a matched region from the images set to the each of a plurality of the frames. In this case, the display device may determine the correlation on the basis of the extent of being matched of the aforementioned region. And, as an example, as mentioned in the foregoing description, the display device 100 may set a first frame group based on correlation of a partial frame among a plurality of the frames.

Subsequently, the display device 100 may set a first point and a second point on the time interface based on the first frame group [S1230]. As mentioned earlier in FIG. 2a and FIG. 2b, the display device 100 may set the first point on the timeline interface 220 with a point corresponding to a first frame 211 included in the video image. In this case, the first frame 211 may correspond to a frame of top priority in time order among a first contiguous frame group 213. In particular, the first frame 211 may correspond to a firstly played frame among the first contiguous frame group 213. And, the display device 100 may set the second point on the timeline interface 220 with a point corresponding to a second frame 212 included in the video image. In this case, the second frame 212 may correspond to a frame of lowest priority in time order among the first contiguous frame group 213. In particular, the second frame 212 may correspond to a lastly played frame among the first contiguous frame group 213.

Subsequently, the display device 100 may set a first panorama section between the set first point and the second point [S1240]. As mentioned earlier with reference to FIG. 2d, the display device 100 may set frames of which a matched rate of the images set to a plurality of the frames is greater than a predetermined ratio and the frames contiguous with each other in time order as the first contiguous frame group 213. In this case, as mentioned in the foregoing description, the display device 100 may set the first panorama section based on the first contiguous frame group.

Subsequently, the display device 100 may display a first panorama interface corresponding to the first panorama section [S1250]. As mentioned earlier in FIG. 4a and FIG. 4b, the display device 100 may display a first indicator and a second indicator based on the first panorama interface. In this case, the first indicator and the second indicator may correspond to an indicator indicating the first panorama section. In this case, the display device 100 may reset the first panorama section based on a movement of the first indicator and the second indicator. And, the display device 100 may display the first panorama interface based on the reset first panorama section.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A display device 100 according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a display device 100 according to the present specification and a method of controlling therefor may be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor may be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations may be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions may be complementarily applied, if necessary.

What is claimed is:

1. A display device, comprising:
a touchscreen configured to display a video image and a timeline interface corresponding to the video image;
a control input sensor configured to detect a control input; and
a processor configured to:
detect a matched region from images set to each of a plurality of frames included in the video image,
determine a first matching rate between a first image of a first frame and a second image of a second frame based on a first detected matched region from the first image and the second image,
determine a second matching rate between the second image of the second frame and a third image of a third frame based on a second detected matched region from the second image and the third image,
determine a third matching rate between the first image of the first frame and the third image of the third frame based on a third detected matched region from the first image and the third image, wherein the first frame, the second frame and the third frame are included in the plurality of the frames,
if the first matching rate is greater than a predetermined rate, the second matching rate is greater than the predetermined rate and the third matching rate is less than the predetermined rate, set the first frame, the second frame and the third frame as a first frame group based on the second frame,
set a first point and a second point on the timeline interface based on the first frame group,
set a first panorama section between the set first point and the set second point,
display a first indicator and a second indicator at both ends of the first panorama section,
display a first panorama interface including images set to contiguous frames included in the first panorama section in the displayed timeline interface, wherein the images in the first panorama section depict one or more objects or scenery in the frames, and
in response to a first control input touching the first panorama interface from the displayed timeline interface, generate a first panorama image by using the contiguous frames contained in the first frame group;
wherein at least one of the first indicator and the second indicator is movable on the timeline interface.

2. The display device of claim 1, wherein the processor is further configured to:
set the first panorama section as a section corresponding to a first contiguous frame group,
wherein the first contiguous frame group corresponds to the contiguous frames contained in the first frame group,
set the first point to a position corresponding to a first frame of the first contiguous frame group on the timeline interface, and
set the second point to a position corresponding to a last frame of the first contiguous frame group on the timeline interface.

3. The display device of claim 1, wherein the processor is further configured to:
if the first indicator or the second indicator moves in a section between the first point and the second point on the timeline interface, reset the first panorama section based on a position of the moved first indicator or a position of the moved second indicator and display the first panorama interface based on the reset first panorama section.

4. The display device of claim 3, wherein the processor is further configured to:
if the first indicator or the second indicator moves outside the section between the first point and the second point on the timeline interface, display a third indicator.

5. The display device of claim 4, wherein the third indicator corresponds to an indicator indicating a section to which the first panorama section is unable to be set on the timeline interface.

6. The display device of claim 1, wherein the processor is further configured to:
if at least one of the first indicator and the second indicator moves, change a size of the first panorama image based on the movement.

7. The display device of claim 2, wherein the processor is further configured to:
generate a first image by combining images set to each of frames contained in the first contiguous frame group with each other, and
generate the first panorama image by eliminating a partial region of the first image from the first image based on a first boundary and eliminating a partial region of the first image from the first image based on a second boundary.

8. The display device of claim 7, wherein the first boundary corresponds to a boundary of the first image positioned at the top of a center point of the first image and the boundary nearest from the center point, and
wherein the second boundary corresponds to a boundary of the first image positioned at the bottom of the center point of the first image and the boundary nearest from the center point.

9. The display device of claim 1, wherein the processor is further configured to:
set the first point as a position corresponding to a firstly played frame among the frames contained in the first frame group, and
set the second point as a position corresponding to a lastly played frame among the frames contained in the first frame group.

10. The display device of claim 2, wherein the processor is further configured to:
set a third point to a position corresponding to a first frame of a second contiguous frame group on the timeline interface,
set a fourth point to a position corresponding to a last frame of the second contiguous frame group on the timeline interface,
set a section between the third point and the fourth point as a second panorama section, and
display a second panorama interface corresponding to the second panorama section, and
wherein the second contiguous frame group corresponds to another contiguous frames in the first frame group.

11. The display device of claim 10, wherein the processor is further configured to:
if the first panorama section and the second panorama section are capable of being connected with each other, set the first panorama interface and the second panorama interface to have an identical interface property.

12. The display device of claim 11, wherein the interface property includes at least one of a light, a shade, a color and a size.

13. The display device of claim 10, wherein the processor is further configured to:
if the first panorama section and the second panorama section are capable of being connected with each other, display a first indicator connecting the first panorama interface and the second panorama interface with each other.

14. The display device of claim 13, wherein the processor is further configured to:
if a second control input selecting the first indicator is detected, set a third panorama section connecting the first panorama section and the second panorama section with each other and display a third panorama interface corresponding to the third panorama section.

15. The display device of claim 1, further comprising a memory configured to store data,
wherein the processor is further configured to store the data combining the video image and a first panorama image generated based on the first panorama section.

16. A method of controlling a display device, the method comprising:
displaying, via a touchscreen, a video image and a timeline interface corresponding to the video image;
detecting, via a processor, a matched region from the images set to the each of a plurality of the frames;
determining, via the processor, a first matching rate between a first image of a first frame and a second image of a second frame based on a first detected matched region from the first image and the second image;
determining, via the processor, a second matching rate between the second image of the second frame and a third image of a third frame based on a second detected matched region from the second image and the third image;
determining a third matching rate between the first image of the first frame and the third image of the third frame based on a third detected matched region from the first image and the third image, wherein the first frame, the second frame and the third frame are one of the plurality of the frames;
if the first matching rate is greater than a predetermined rate, the second matching rate is greater than the predetermined rate and the third matching rate is less than the predetermined rate, setting, via the processor, the first frame, the second frame and the third frame as a first frame group based on the second frame;
setting, via the processor, a first point and a second point on the timeline interface based on the first frame group;
setting, via the processor, a first panorama section between the set first point and the second point;
displaying a first indicator and a second indicator at both ends of the first panorama section;
displaying, via the touchscreen, a first panorama interface including images set to contiguous frames included in the first panorama section in the displayed timeline interface, wherein the images in the first panorama section depict one or more objects or scenery in the frames; and
in response to a first control input touching the first panorama interface from the displayed timeline interface, generating a first panorama image by using the contiguous frames contained in the first frame group,
where at least one of the first indicator and the second indicator is movable on the timeline interface.

* * * * *